(12) United States Patent
Wang et al.

(10) Patent No.: US 7,573,337 B2
(45) Date of Patent: Aug. 11, 2009

(54) CODE NCO AND GPS RECEIVER

(75) Inventors: Dun Wang, Nishinomiya (JP); Tsutomu Okada, Nishinomiya (JP)

(73) Assignee: Furuno Electric Company, Ltd., Hyogo-Pref. (JP)

( * ) Notice: Subject to any disclaimer, the term of this patent is extended or adjusted under 35 U.S.C. 154(b) by 214 days.

(21) Appl. No.: 11/663,147

(22) PCT Filed: Jul. 4, 2005

(86) PCT No.: PCT/JP2005/012331
§ 371 (c)(1),
(2), (4) Date: Mar. 16, 2007

(87) PCT Pub. No.: WO2006/030576
PCT Pub. Date: Mar. 23, 2006

(65) Prior Publication Data
US 2007/0263701 A1 Nov. 15, 2007

(30) Foreign Application Priority Data
Sep. 16, 2004 (JP) .............................. 2004-269583

(51) Int. Cl.
*G06F 1/02* (2006.01)
*H03B 28/00* (2006.01)
(52) U.S. Cl. .............. 331/1 A; 331/177 R; 331/DIG. 3; 708/271; 327/107; 342/357.01
(58) Field of Classification Search ................ 331/1 A, 331/177 R, DIG. 3; 327/105, 106, 107, 113; 708/271; 342/357.01–357.17
See application file for complete search history.

(56) References Cited

U.S. PATENT DOCUMENTS 4,556,984 A * 12/1985 Genrich ........................ 377/47

(Continued)

FOREIGN PATENT DOCUMENTS

| EP | 0 944 842 B1 | 2/2002 |
| WO | WO-98/26302 | 6/1998 |

OTHER PUBLICATIONS

International Search Report dated Aug. 23, 2005.

(Continued)

*Primary Examiner*—Robert Pascal
*Assistant Examiner*—Ryan J. Johnson
(74) *Attorney, Agent, or Firm*—Edwards Angell Palmer & Dodge LLP; Catherine J. Toppin

(57) ABSTRACT

A code is provided which outputs a predetermined code enable signal by executing a simple control, depending on a clock signal frequency, with an optimal circuit scale. A multiplexer receives integers which are relatively prime, and outputs either of them to an adder, depending on comparator output signal. The adder adds an integer latched by the register and an integer output by the multiplexer, and outputs the result via a multiplexer to the register. The register latches and outputs the received integer to the comparator with a sampling clock signal frequency. In accordance with a threshold set based on the integers and the number of bits of the adder or the register, the comparator outputs a signal having the High state only when the output integer of the register satisfies the threshold condition. The code outputs this as a code enable signal.

6 Claims, 20 Drawing Sheets

U.S. PATENT DOCUMENTS 5,663,733 A    9/1997   Lennen
5,663,833 A    9/1997   Nanba et al.
6,067,328 A    5/2000   Lewellen et al.
6,125,325 A *  9/2000   Kohli ........................ 701/213
7,281,025 B2 * 10/2007  Sullivan et al. ............. 708/271

OTHER PUBLICATIONS

Thompson, "Low-Latency, High-Speed Numerically Controlled Oscillator Using Progression-of-States Technique," IEEE Journal of Solid-State Circuits, 27:113-117 (1992).

\* cited by examiner

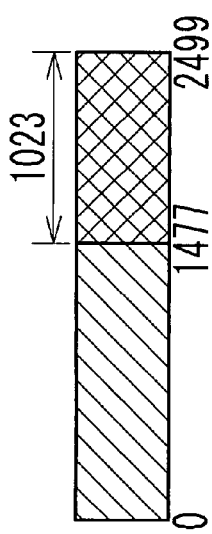
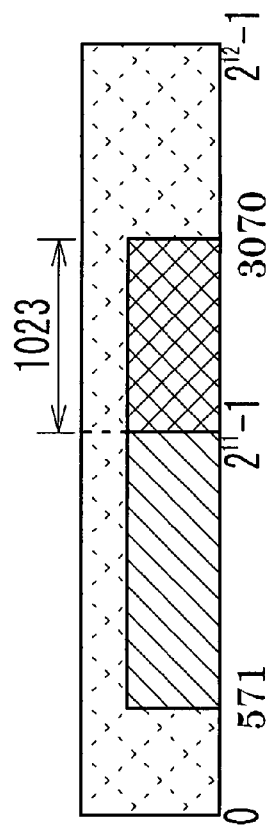
FIG. 20 (a)
FIG. 20 (b)

CODE NCO AND GPS RECEIVER

TECHNICAL FIELD

The present invention relates to a code NCO for outputting a code enable signal which is used to generate a PN code, which is a C/A code or a P(Y) code, and a GPS receiver comprising the code NCO.

BACKGROUND ART

Conventionally, GPS receivers demodulate a signal modulated with a PN code to observe a carrier phase, a code phase, a navigation message and the like, which are used for positioning. As a method of demodulating the signal, initially, the received GPS signal is separated into an in-phase signal and a quadrature signal, which are in turn subjected to A/D conversion. Next, an in-phase signal and a quadrature signal in a base band are generated based on a carrier phase signal output from a carrier NCO. These signals and a PN code from a PN code generator are subjected to a correlation process, thereby reproducing information, such as a carrier phase, a code phase, a navigation message, and the like.

The GPS receiver comprises a code NCO as a code generator for generating a code enable signal which gives the PN code generator the timing of generating a PN code.

FIG. 18 is a block diagram schematically illustrating a configuration of a conventional general code NCO.

As illustrated in FIG. 18, the conventional code NCO comprises an adder 101, a multiplexer (MPX) 102, a register 103, and a latch circuit 104. The adder 101 receives a predetermined set value P, and an integer output from the register 103, and outputs the sum of these values to the multiplexer 102. The latch circuit 104 receives a phase adjustment value CPA (Code Phase Adjustment) for adjusting a phase of the code NCO, and a write enable signal WE, from a microprocessor (not shown), and outputs the phase adjustment value CPA with timing of the write enable signal WE. The multiplexer 102 receives the integer output from the adder 101 and the phase adjustment value CPA output from the latch circuit 104, and outputs either of them in accordance with an adjust timing signal AD (Adjust Timing). The register 103 latches and outputs a signal input from the multiplexer 102 to the adder 101 based on a sampling clock signal SCLK (hereinafter referred to as a "clock signal"), and also outputs the signal as a code enable signal.

In this case, a set value P is obtained by the following expression.

$$P = \frac{f_0}{f_s} \times 2^L \quad (1)$$

However, the set value P, which depends on the relationship between a frequency ($f_s$) of the clock signal SCLK and a frequency $f_o$ of the code enable signal, is not always an integer. In this case, a so-called rounding error occurs, resulting in a reduction in code resolution of the code NCO or the occurrence of a cumulative error. Here, the resolution reduction can be overcome by increasing the number of bits of the adder or the register, and the occurrence of a cumulative error can be overcome by regularly inputting a phase adjustment value. However, this causes another problem, e.g., the circuit scale of the code NCO is increased, or the control is complicated.

An apparatus which solves such a problem is described in Patent Document 1. FIG. 19 is a block diagram schematically illustrating a configuration of the apparatus.

As illustrated in FIG. 19, a conventional code NCO having another configuration comprises a multiplexer 201, an adder 202, and a latch circuit 203.

The multiplexer 201 is operated either in a shift mode or in a normal mode.

In the shift mode, the multiplexer 201 receives and outputs a phase control value (CONTROL) to the adder 202. Here, the phase control value (CONTROL) is represented by the following expression, where L represents the number of bits of the adder 202 and the latch circuit 203.

$$\text{CONTROL} = \frac{M - \text{SHIFT}}{2^L - M + N} \quad (2)$$

Here, SHIFT represents a phase amount by which the phase control value (CONTROL) is shifted from the current phase, in units of clock signals (SCLK).

In the normal mode, the multiplexer 201 selects and outputs an integer N or an integer M, depending on the value of Q12 of the latch circuit 203, which is input to a selector terminal (SELECT). Here, when Q12 is "0", the integer N is output, and when Q12 is "1", the integer M is output.

The adder 202 adds a value input from the multiplexer 201 and a value output from the latch circuit 203, and outputs the result to the latch circuit 203.

The latch circuit 203 latches the output from the adder 202 using the input clock signal SCLK. In this case, if Q12 is "1", the output signal of the latch circuit 203 is externally output as a code enable signal CEC.

In the output of the thus-configured NCO, a frequency $f_o$ of the code enable signal CEC can be represented by the following expression.

$$f_0 = \frac{N \times f_s}{2^L - M + N} \quad (3)$$

The code NCO is optimally used under the following conditions.

The conditions are as follows: the frequency $f_s$ of the clock signal SCLK is 25 MHz, the number L of bits is 12, the integer N is 1023, and the integer M is 2619. In this case, the frequency $f_o$ of the code enable signal CEC is 10.23 MHz.

Patent Document 1: U.S. Pat. No. 5,663,733, Sep. 2, 1997

DISCLOSURE OF INVENTION

Problem to be Solved by the Invention

However, in the code NCO described in Patent Document 1 above, assuming that the frequency $f_o$ of the code enable signal CEC is 10.23 MHz, only when the frequency $f_s$ of the clock signal SCLK is 25 MHz, the optimal circuit conditions are obtained. When the frequency $f_s$ of the clock signal SCLK is further increased so as to improve the resolution, the optimal conditions can no longer be obtained.

A relationship between machine states and a state space achieved by the number of bits of the circuit configuration in the code NCO of Patent Document 1, is illustrated in FIG. 20.

FIG. 20 is a state diagram illustrating the relationship between the machine states and the state space. FIG. 20(a)

illustrates a state diagram before the machine states are mapped to the state space. FIG. 20(b) illustrates a state diagram after the machine states are mapped to the state space.

As illustrated in FIG. 20, when the frequency $f_s$ of the input clock signal SCLK is 25 MHz, the machine states includes 2500 states (0 to 2499). In the code NCO of FIG. 19, 1023 states corresponding to the frequency $f_o$ (10.23 MHz) of the code enable signal CEC are positioned on an upper end side of the machine states, for which machine states 1477 to 2499 are used.

On the other hand, since the output Q12 of the latch circuit 203 is used as an enable signal for the output of the multiplexer 201, the 1023 states corresponding to the code enable signal CEC need to be positioned at the upper half of all the states (0 to 4095 ($2^{12}-1$)) in the state space. In other words, the 1023 states corresponding to the code enable signal CEC need to be positioned at states 2048 ($2^{11}$) to 4095 ($2^{12}-1$) in the state space. As a result, the 1023 states corresponding to the code enable signal CEC need to be positioned at 2048 ($2^{11}$) to 3070 in the state space.

However, in such a configuration, when the clock frequency $f_s$ is 30.71 MHz or more, 3071 or more machine states are required. Therefore, when the clock frequency $f_s$ of 30.71 MHz or more is attained, 1023 or more state states are present at the upper half of the space, so that a code enable signal of 10.23 MHz cannot be generated. As a result, in the above-described configuration, unless the number of bits is increased, the code enable signal of 10.23 MHz cannot be generated using a clock signal of 30.71 MHz or more. In other words, it is not possible to configure a code NCO which outputs a code enable signal of 10.23 MHz with an optimal circuit scale and by an easy control, with respect to a clock signal of 30.71 MHz or more.

Therefore, an object of the present invention is to provide a code NCO which, even when receiving a clock signal having a frequency higher than that of conventional clock signals, correctly outputs a predetermined code enable signal, depending on the frequency, with an optimal circuit scale and by an easy control, and a GPS receiver comprising the code NCO.

Means for Solving Problem

The present invention provides a code NCO for generating a code enable signal for code phase observation, comprising (A) a first multiplexer which is configured to receive two relatively prime integers, and to feed either of the two integers as a first integer output in accordance with a select signal, (B) an adder which is configured to add the first integer output from the first multiplexer and an integer output from a register in order to feed a second integer output, (C) a second multiplexer which is configured to receive the second integer output from the adder and a code phase adjustment value, and to feed either of them as a third integer output based on an adjustment signal, (D) the register which is configured to latch and to feed the third integer output from the second multiplexer as a fourth integer output in accordance with a sampling clock signal, and (E) a select signal generator which is configured to output the select signal when the select signal generator detects that the fourth integer output from the register is a predetermined integer value which is previously set. The select signal is the code enable signal.

With this configuration, when an integer output from the adder after successive addition over time reaches a predetermined integer value set in the select signal generator, the select signal generator outputs a select signal to the first multiplexer. For example, if the integer output from the adder is a predetermined integer value within the previously set integer range, a select signal having the High state "1" is output. If it is not the predetermined integer value, a select signal having the Low state "0" is output. The first multiplexer outputs either of the two input integers to the adder, depending on the input select signal. In other words, different integers are output to the adder between when the select signal has the Low state "0" and when the select signal has the High state "1". By executing the loop operation, the select signal output from the select signal generator has a predetermined periodicity. Here, by setting the two integers input to the first multiplexer and the predetermined integer value of the select signal generator as appropriate, depending on the frequency of a sampling clock signal used, the frequency of a code enable signal to be obtained, and the number of bits of the constituent circuit, a select signal having the High state "1" and a predetermined frequency which is the frequency of a code enable signal is output. In other words, a code enable signal having the predetermined frequency is output.

In this invention, the select signal generator includes a comparator which is configured to compare the fourth integer output from the register with a threshold determined from the two integers in order to output the select signal.

With this configuration, when an integer latched and output from the adder after successive addition over time has a predetermined relationship with a threshold set in the comparator, the comparator outputs a select signal to the first multiplexer. For example, if the integer output from the adder is within a predetermined integer range set by the threshold, a select signal having the High state "1" is output. If it is not within the predetermined integer range, a select signal having the Low state "0" is output. The first multiplexer outputs either of the two input integers to the adder, depending on the input select signal. In other words, different integers are output to the adder between when the select signal has the Low state "0" and when the select signal has the High state "1". By executing the loop operation, the select signal output from the comparator has a predetermined periodicity. Here, by setting the two integers input to the first multiplexer, the threshold of the comparator, and the predetermined integer range as appropriate, depending on the frequency of a sampling clock signal used, the frequency of a code enable signal to be obtained, and the number of bits of the constituent circuit, a select signal having the High state "1" and a predetermined frequency which is the frequency of a code enable signal is output. In other words, a code enable signal having the predetermined frequency is output.

In this invention, the select signal generator includes an AND operator which is configured to output the select signal by using a result of subjecting values of a plurality of predetermined bits of the register to an AND process.

With this configuration, when the values of the predetermined bits of the register have a predetermined relationship, the AND operator outputs a select signal to the first multiplexer. For example, if the most significant bit and the immediately less significant bit of the register both have the High state "1", the AND operator outputs a select signal having the High state "1". Unless the most significant bit and the immediately less significant bit of the register both have the High state "1", a select signal having the Low state "0" is output. The first multiplexer outputs either of the two input integers to the adder, depending on the input select signal. In other words, different integers are output to the adder between when the select signal has the Low state "0" and when the select signal has the High state "1". By executing the loop operation, the select signal output from the AND operator has a predetermined periodicity. Here, by setting the two integers input to the first multiplexer and the bits of resister subjected to the AND process by the AND operator as appropriate, depending on the frequency of a sampling clock signal used, the frequency of a code enable signal to be obtained, and the number of bits of the constituent circuit, a select signal having the High state "1" and a predetermined frequency which is the frequency of a code enable signal is output. In other words, a code enable signal having the predetermined frequency is output.

In this invention, the select signal generator is a NOR operator which is configured to output the select signal by using a result of subjecting values of a plurality of predetermined bits of the register to a NOR process.

With this configuration, when the values of the predetermined bits of the register have a predetermined relationship, the NOR operator outputs a select signal to the first multiplexer. For example, if the most significant bit and the immediately less significant bit of the register both have the Low state "0", the NOR operator outputs a select signal having the High state "1". Unless the most significant bit and the immediately less significant bit of the register both have the Low state "0", a select signal having the Low state "0" is output. The first multiplexer outputs either of the two input integers to the adder, depending on the input select signal. In other words, different integers are output to the adder between when the select signal has the Low state "0" and when the select signal has the High state "1". By executing the loop operation, the select signal output from the NOR operator has a predetermined periodicity. Here, by setting the two integers input to the first multiplexer and the bits of register subjected to the NOR process by the NOR operator as appropriate, depending on the frequency of a sampling clock signal used, the frequency of a code enable signal to be obtained, and the number of bits of the constituent circuit, a select signal having the High state "1" and a predetermined frequency which is the frequency of a code enable signal is output. In other words, a code enable signal having the predetermined frequency is output.

Also, the present invention provides a code NCO for generating a code enable signal for code phase observation, comprising (F) a first multiplexer which is configured to receive two relatively prime integers, and to output either of the two integers as a first integer output in accordance with a select signal, (G) an adder which is configured to add the first integer output from the first multiplexer and an integer output from a register in order to feed a second integer output, and to output the select signal when the adder detects an end portion of a usable bit area, (H) a second multiplexer which is configured to receive the second integer output from the adder and a code phase adjustment value, and to feed either of them as a third integer output based on an adjustment signal, and (I) the register which is configured to latch and to feed the third integer output from the second multiplexer to the adder as the integer output in accordance with a sampling clock signal. The select signal is the code enable signal.

With this configuration, when an integer output from the adder after successive addition over time reaches the upper or lower limit of the adder, the adder detects this and outputs a select signal to the first multiplexer. In other words, depending on whether or not the sum value is present within a predetermined range in a direction opposite to a direction in which the integer is changed from the upper and lower limits of the adder by the operation, a select signal is output with the next timing. For example, if the adder detects the upper or lower limit, i.e., the sum value is present within the predetermined range, a select signal having the High state "1" is output with the next timing. On the other hand, while the sum value is present within another range, a select signal having the Low state "0" is output. The first multiplexer outputs either of the two input integers to the adder, depending on the input select signal. In other words, different integers are output to the adder between when the select signal has the Low state "0" and when the select signal has the High state "1". By executing the loop operation, the select signal has a predetermined periodicity. Here, by setting the two integers input to the first multiplexer as appropriate, depending on the frequency of a sampling clock signal used, the frequency of a code enable signal to be obtained, and the number of bits of the constituent circuit, a select signal having the High state "1" and a predetermined frequency which is the frequency of a code enable signal is output. In other words, a code enable signal having the predetermined frequency is output.

A GPS receiver of the present invention comprises the above-described code NCO. The GPS receiver captures and tracks a code phase of a GPS signal by using a PN code generated based on a code enable signal output from the code NCO.

With this configuration, the code NCO correctly outputs a code enable signal. Therefore, based on the code enable signal, a correct PN code is generated. By using the PN code, a high-precision correlation process with a GPS signal is achieved. Thereby, the code phase is captured and tracked with high precision, resulting in high-precision positioning.

Effects of the Invention

According to the present invention, it is possible to configure a compact code NCO which has an optimal circuit configuration and outputs a code enable signal having a desired frequency by an easy control, depending on a frequency of an input sampling clock signal. In other words, it is possible to configure a code NCO which outputs a code enable signal with high precision by a simple control flow, using circuit constituting elements having a minimum number of bits, without an influence of the frequency of the sampling clock signal.

Also, according to the present invention, by employing the above-described code NCO, it is possible to configure a GPS receiver which generates a high-precision PN code, and executes a correlation process with respect to a GPS signal with high precision. Since the GPS signal is subjected to the high-precision correlation process, the code phase is reliably captured and tracked, resulting in high-precision and reliable relative positioning.

BRIEF DESCRIPTION OF DRAWINGS

FIG. 20 is a state diagram illustrating a relationship between machine states and a state space in the conventional code NCO.

Description of Reference Numerals

| | |
|---|---|
| 1, 4, 102, 201 | mulfiplexer (MPX) |
| 2, 7, 101, 202 | adder |
| 3, 104, 203 | latch circuit |
| 5, 103 | register |
| 6 | comparator |
| 61 | AND operator |
| 62 | NOR operator |
| 8 | inverter |
| 11 | antenna |
| 12 | RF processor |
| 13 | A/D converter |
| 14 | phase rotator |
| 15 | correlator |
| 16 | PN code generator |
| 17 | code NCO |
| 18 | carrier NCO |
| 19 | microprocessor |

BEST MODE FOR CARRYING OUT THE INVENTION

A code NCO according to a first embodiment of the present invention will be described with reference to FIGS. 1 and 2.

Figure 1:
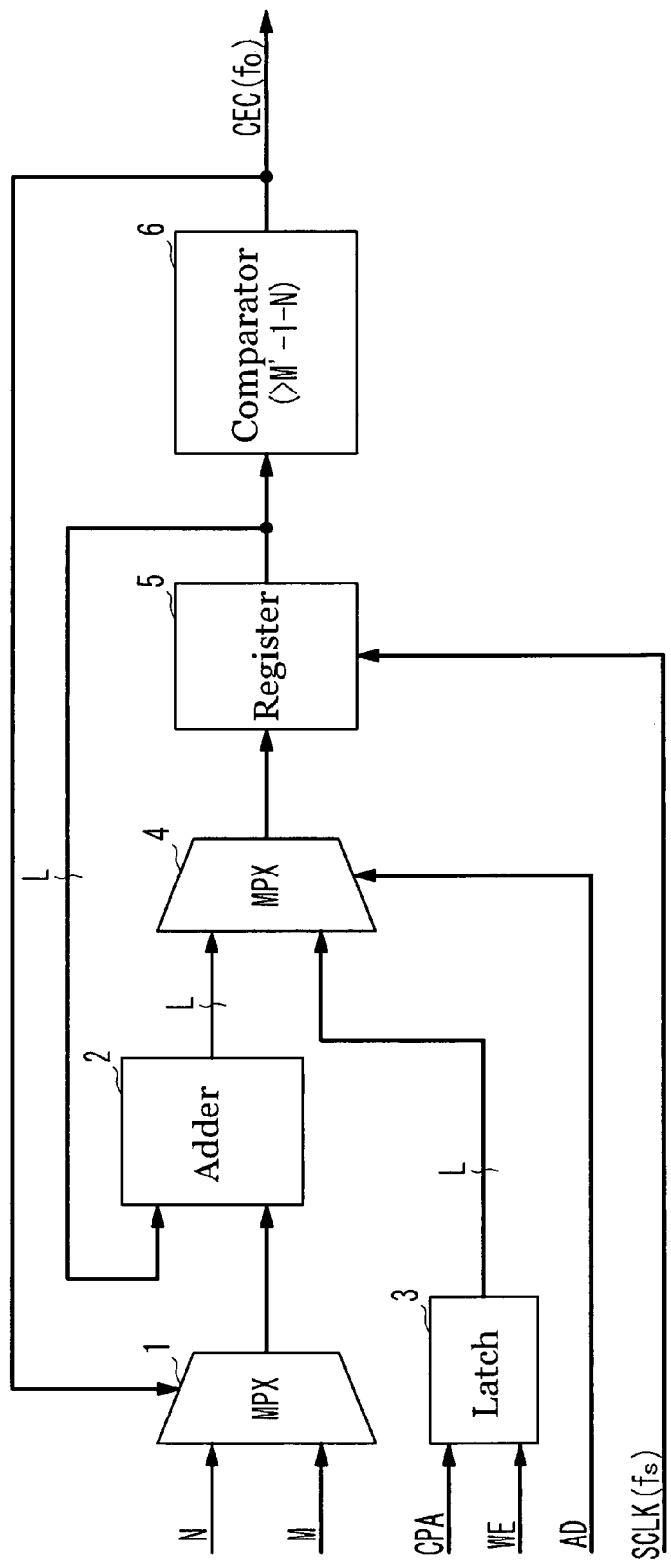
FIG. 1 is a block diagram illustrating a configuration of a code NCO according to a first embodiment.

FIG. 1 is a block diagram illustrating a configuration of the code NCO of this embodiment.

The code NCO of FIG. 1 comprises multiplexers (MPXs) 1 and 4, an adder 2, a latch circuit 3, a register 5, and a comparator 6. The multiplexers 1 and 4, the adder 2, the latch circuit 3, and the register 5 each have an L-bit digital operation circuit.

The multiplexer 1 receives two integers N and M which are relatively prime, and also receives a select signal which is an output signal of the comparator 6. The multiplexer 1 outputs either of the two integers N and M in accordance with the select signal. For example, in this embodiment, the multiplexer 1 outputs the integer N when the select signal is in the High state "1", and the integer M when the select signal is in the Low state "0". Here, the multiplexer 1 corresponds to the "first multiplexer" of the present invention.

The adder 2 adds an integer output from the multiplexer 1 to an output value from the register and outputs the result.

The latch circuit 3 receives a phase adjustment value CPA (Code Phase Adjustment) for controlling a code phase, and a write enable signal WE, and outputs the phase adjustment value CPA with timing of the write enable signal WE.

The multiplexer 4 receives an output value of the adder 2 and an output value (the phase adjustment value CPA) from the latch circuit 3, and also receives an adjust timing signal AD (Adjust Timing). With timing given by the adjust timing signal AD, the multiplexer 4 outputs either of the output value from the adder 2 and the output value from the latch circuit 3. Specifically, with timing when the adjust timing signal AD is input, the multiplexer 4 outputs the phase adjustment value CPA (shift mode), and with the other timing, the multiplexer 4 outputs the output value from the adder 2 (normal mode). Here, the multiplexer 4 corresponds to the "second multiplexer" of the present invention.

The register 5 receives an output value of the multiplexer 4 and a sampling clock signal SCLK (hereinafter referred to as a "clock signal"). The register 5 latches and outputs the output value of the multiplexer 4, depending on a frequency $f_s$ of the sampling clock signal SCLK (hereinafter referred to as a "clock frequency"). The output value is input to the comparator 6 and the adder 2.

The comparator 6 receives and compares an output value of the register 5 with a previously set threshold, and depending on the result of the comparison, outputs a select signal having either of the values of the High state "1" and the Low state "0". The threshold is set based on the clock frequency $f_s$, the frequency $f_o$ of a code enable signal to be obtained, and the integer N input to the multiplexer 1.

$$M' = N \times \frac{f_s}{f_0}$$

The threshold is represented by (M'−N−1), where M' is represented by an expression above.

Specifically, in the code NCO of FIG. 1, if the output value of the register 5 is larger than the threshold set as (M'−N−1), the output signal of the comparator 6 is in the High state "1". If the output value of the register 5 is smaller than or equal to the threshold set as (M'−N−1), the output signal of the comparator 6 is in the Low state "0". Here, the comparator 6 corresponds to the "select signal generator" of the present invention.

In such a code NCO, the integers N and M and the number L of bits are set using the following expression, from the clock frequency $f_s$ and the frequency $f_o$ of a code enable signal to be obtained.

$$\frac{f_0}{f_s} = \frac{N}{M'} \quad (4)$$

$$L = \min_{L'}(M' \le 2^{L'}) \quad (5)$$

$$M = 2^L - M' + N \quad (6)$$

By providing such settings and using the configuration of FIG. 1, the select signal of the comparator 6 goes to the High state "1" in cycles corresponding to the frequency $f_o$ in the normal mode (a specific operation will be next described). As a result, by extracting a signal output from the comparator 6, a code enable signal having the desired frequency $f_o$ can be output. On the other hand, in the shift mode, a state movement amount is adjusted, depending on the amount of a shift in the code phase, thereby executing phase adjustment.

Here, an operation of the code NCO of FIG. 1 when the integers N and M, the number L of bits, the clock frequency $f_s$, the frequency $f_o$ of the code enable signal are specifically set, will be described. For example, a description will be given, assuming that the clock frequency $f_s$ is 40 MHz, and a code enable signal having a frequency $f_o$ of 10.23 MHz is generated and output.

From expression (4), if the integer N is set to be 1023, the integer M' is set to be 4000. Also, from expression (5), L is defined so that M' is a minimum integer which does not exceed $2^L$. Therefore, since M' is 4000, L is set to be 12. From expression (6), M is set to be 1119.

Figure 2:
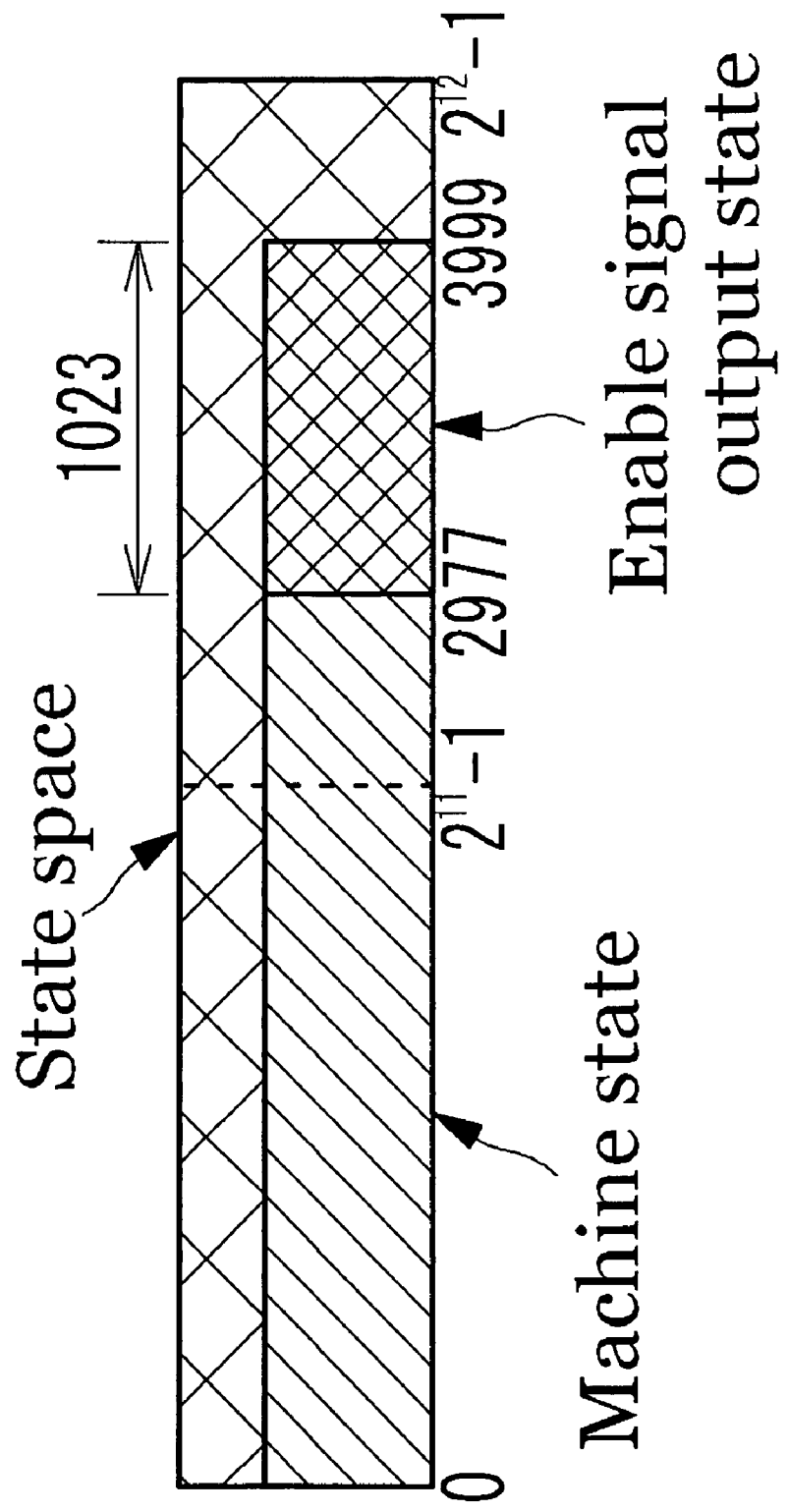
FIG. 2 is a state diagram illustrating a relationship between a state space, machine states, and states corresponding to code enable signals in the code NCO of the first embodiment.

A relationship between a state space, machine states, and states corresponding to code enable signals in such a case is illustrated in FIG. 2.

FIG. 2 is a state diagram illustrating the relationship between the state space, the machine state, and the state corresponding to the code enable signal in the code NCO of this embodiment.

As illustrated in FIG. 2, each circuit constituting element of the code NCO of FIG. 1 has the number L of bits which is 12. Therefore, the whole state space has 4096 (=$2^{12}$) states. Since the clock frequency $f_s$ is 40 MHz, the total number of machine states is 4000. The first machine state of the 4000 machine states starts from state 0 in the state space. The number of states corresponding to the frequency $f_o$ of the code enable signal is represented by 1023 states within the 4000 machine states.

Here, as described above, the comparator 6 outputs a select signal having the High state "1" if the integer value output from the register 5 is larger than a threshold of 2976 (=4000−1023−1), and a select signal having the Low state "0" if the integer value is smaller than or equal to the threshold of 2976. The code NCO of this embodiment outputs this select signal as a code enable signal. Therefore, states corresponding to the code enable signal are represented by states (2977 to 3999) higher than or equal to a threshold of 2977 within the 4000 machine states, which specifically correspond to uppermost 1023 states of the 4000 machine states.

Also, the multiplexer 1 outputs the integer N (1023) to the adder 2 when receiving a select signal having the Low state "0", and the integer M (1119) to the adder 2 when receiving a select signal having the High state "1". Specifically, the multiplexer 1 outputs an integer of 1023 when the value of the output of the adder 2 latched with the clock frequency has a state number of 0 to 2976, and an integer of 1119 when the value of the output of the adder 2 latched with the clock frequency has a state number of 2977 to 3999.

The adder 2 adds either of the input integers of 1023 and 1119 to the output of the register 5. Therefore, the states of the machine states are normally transitioned in an increasing direction.

This operation is repeatedly executed, depending on the clock frequency. The comparator 6 outputs a signal having the High state "1" every time the value of the output of the adder 2 latched with the clock frequency takes a state number of 2977 to 3999.

Figure 19:
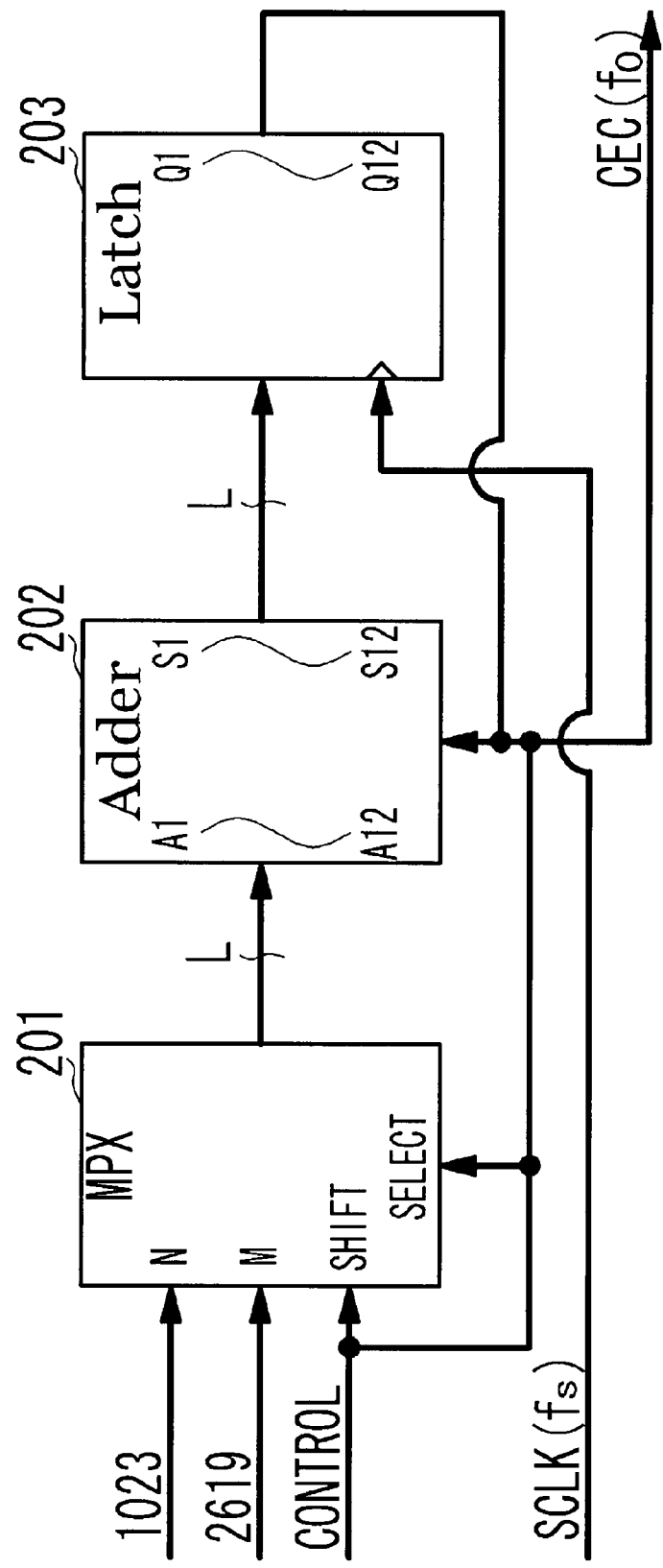
FIG. 19 is a block diagram schematically illustrating a configuration of a code NCO described in Patent Document 1.

With such a configuration, states in which a code enable signal is output are positioned at an end of the machine states provided in the state space without being positioned at a middle of the state space as in the conventional code NCO of FIG. 19. Therefore, it is possible to reliably achieve states in which a code enable signal having a predetermined frequency is output, depending on an input clock frequency. In this case, the number of states in the state space (i.e., the number of bits of constituent circuit elements) is set so that the number of states set with the clock frequency does not exceed the number of states obtained from the number of bits, thereby making it possible to achieve a circuit configuration having a minimum number of bits with certainty.

As described above, by using the code NCO having the configuration of this embodiment, it is possible to reliably generate and output a code enable signal having a desired frequency using circuit constituting elements having a minimum number of bits, depending on a clock frequency, and by an easy control.

Next, a code NCO according to a second embodiment will be described with reference to FIGS. 3 and 4.

Figure 3:
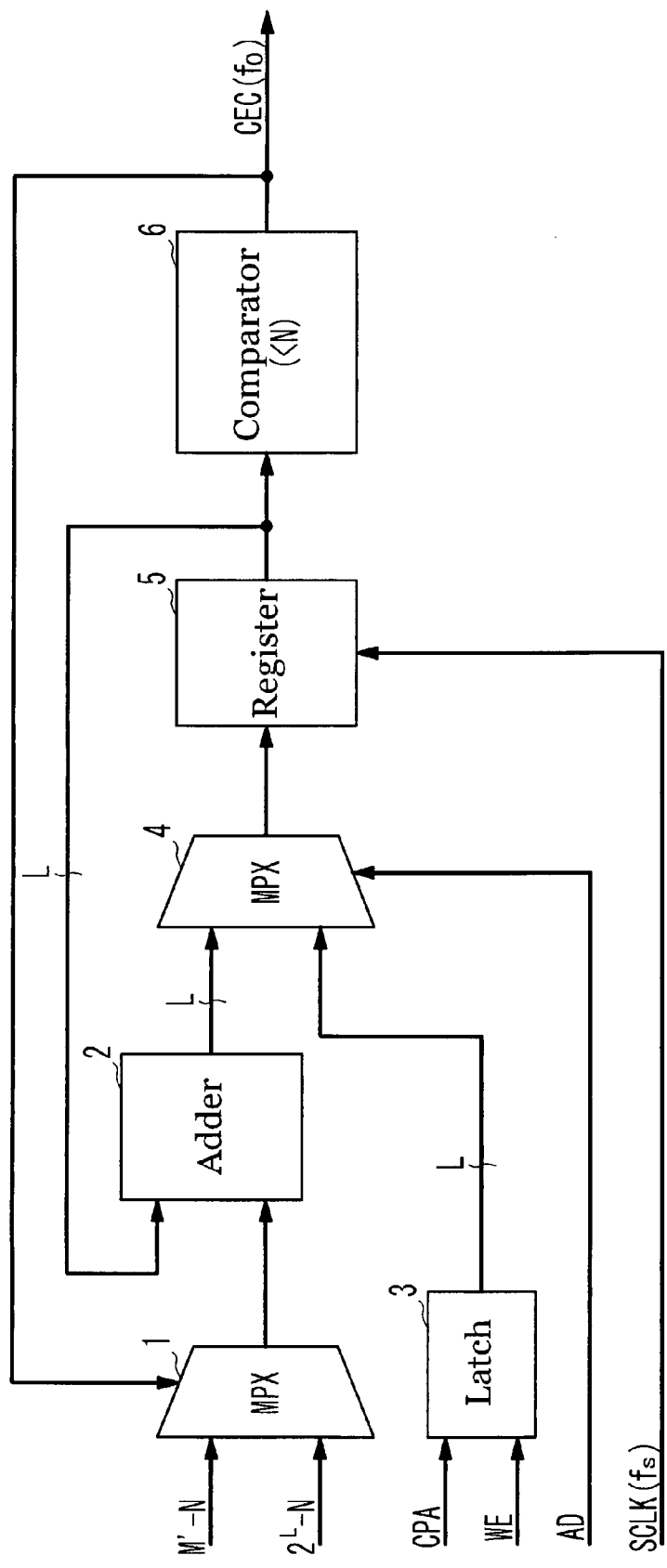
FIG. 3 is a block diagram illustrating a configuration of a code NCO according to a second embodiment.

FIG. 3 is a block diagram illustrating a configuration of the code NCO of this embodiment.

As illustrated in FIG. 3, the code NCO of this embodiment has the same configuration as that of FIG. 1, except for integers input to the multiplexer 1 and a threshold condition for the comparator 6. Here, the comparator 6 corresponds to the "select signal generator" of the present invention.

The multiplexer 1 of the code NCO of this embodiment receives an integer (M'−N) and an integer ($2^L$−N), and outputs the integer (M'−N) when receiving a select signal having the High state "1" from the comparator 6, and the integer ($2^L$−N) when receiving a select signal having the Low state "0" from the comparator 6. Also, the comparator 6 of this embodiment outputs the High state "1" when the output value from the register 5 is smaller than the integer N, and the Low state "0" when the output value from the register 5 is larger than or equal to the integer N.

Figure 4:
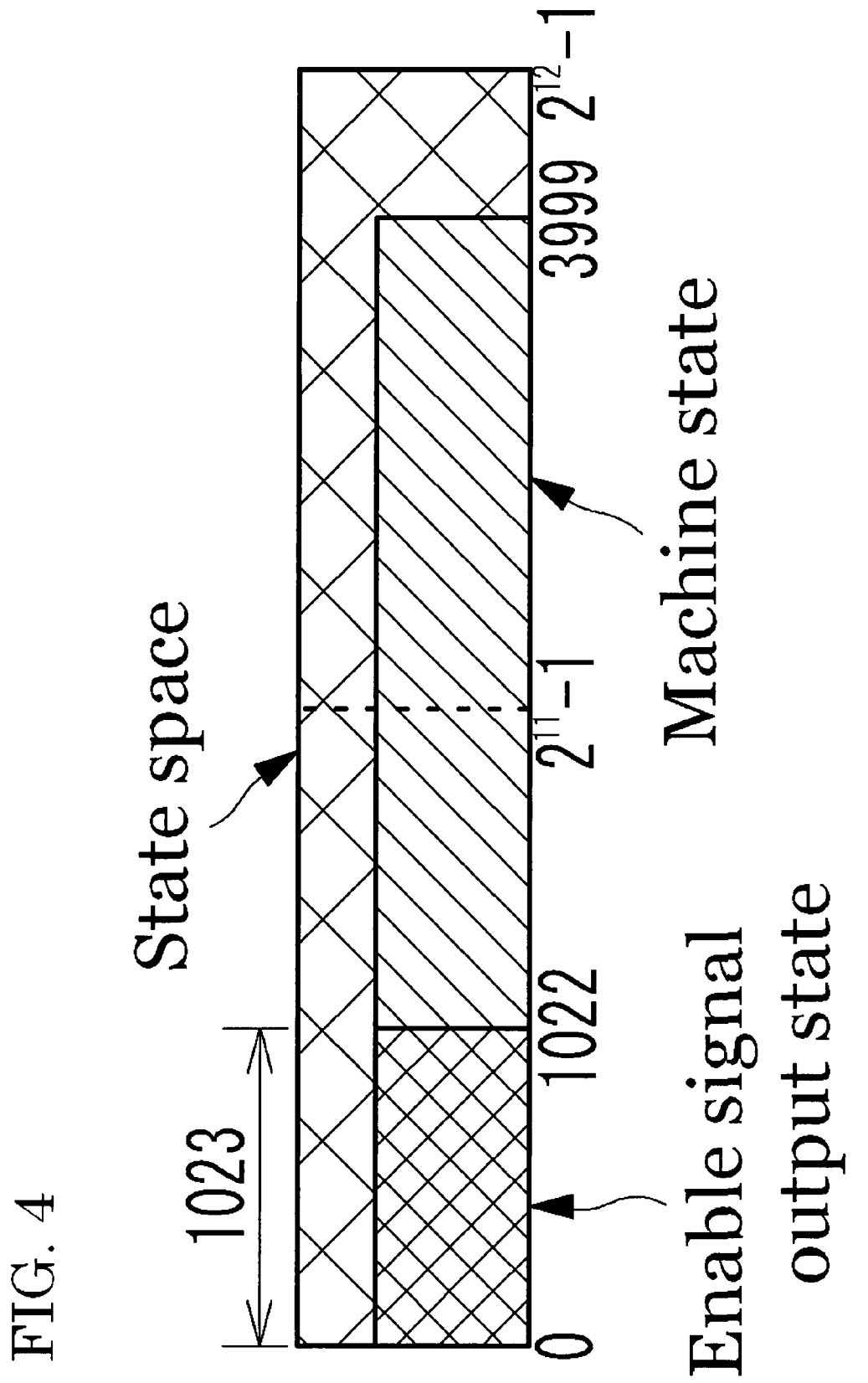
FIG. 4 is a state diagram illustrating a relationship between a state space, machine states, and states corresponding to code enable signals in the code NCO of the second embodiment.

A relationship between a state space, machine states, and states corresponding to code enable signals in the code NCO having such a configuration is illustrated in FIG. 4.

FIG. 4 is a state diagram illustrating the relationship between the state space, the machine state, and the state corresponding to the code enable signal in the code NCO of this embodiment. Note that, also in this example, it is assumed that L is 12, the sampling clock frequency $f_s$ is 40 MHz, the frequency $f_o$ of the code enable signal is 10.23 MHz, the integer N is 1023, and the integer M' is 4000.

As illustrated in FIG. 4, since the code NCO of FIG. 3 has the same basic circuit configuration as that of the code NCO of FIG. 1, the first machine state of the 4000 machine states starting from state 0 is provided within a state space including 4096 states.

Here, in the configuration of this embodiment, the comparator 6 outputs a select signal having the High state "1" when the integer value output from the register 5 is smaller than a threshold of 1023, and a select signal having the Low state "0" when the integer value is larger than or equal to the threshold of 1023. The code NCO outputs the select signal as a code enable signal. Therefore, states corresponding to the code enable signal are represented by states smaller than the threshold of 1023 (0 to 1022) within the 4000 machine states, which specifically correspond to lowermost 1023 states of the 4000 machine states.

Also, the multiplexer 1 outputs the integer value of M'−N (=2977) when receiving a signal having the High state "1", and the integer value of $2^L$−N (=3073) when receiving a signal having the Low state "0". Therefore, the states are transitioned in a decreasing direction in the state space.

This operation is repeatedly executed, depending on the clock frequency. The comparator 6 outputs a signal having the High state "1" every time the value of the output of the adder 2 latched with the clock frequency takes a state number of 0 to 1022.

With such a configuration, an effect similar to that of the code NCO of the first embodiment described above can be obtained.

When a code NCO has a circuit configuration as described in this embodiment (second embodiment) or the first embodiment, the state transition direction can be easily reversed only by changing the setting conditions, i.e., the input integers and the threshold conditions. Thereby, high-precision code phase observation can be achieved using the configurations of the two embodiments of the present invention no matter which of the directions the state transition direction of conventional code NCOs is. In this case, assuming that the integer (phase set value) set in the first embodiment is $P_1$, an integer $P_2$ set in the second embodiment can be easily set as $P_2$=M'−1−$P_1$.

As a result, high-precision code phase observation is easily achieved only by changing the setting conditions, depending on the specification of a conventionally used GPS receiver, thereby facilitating an improvement in the conventional GPS receiver.

Next, a code NCO according to a third embodiment will be described with reference to FIGS. 5 and 6.

Figure 5:
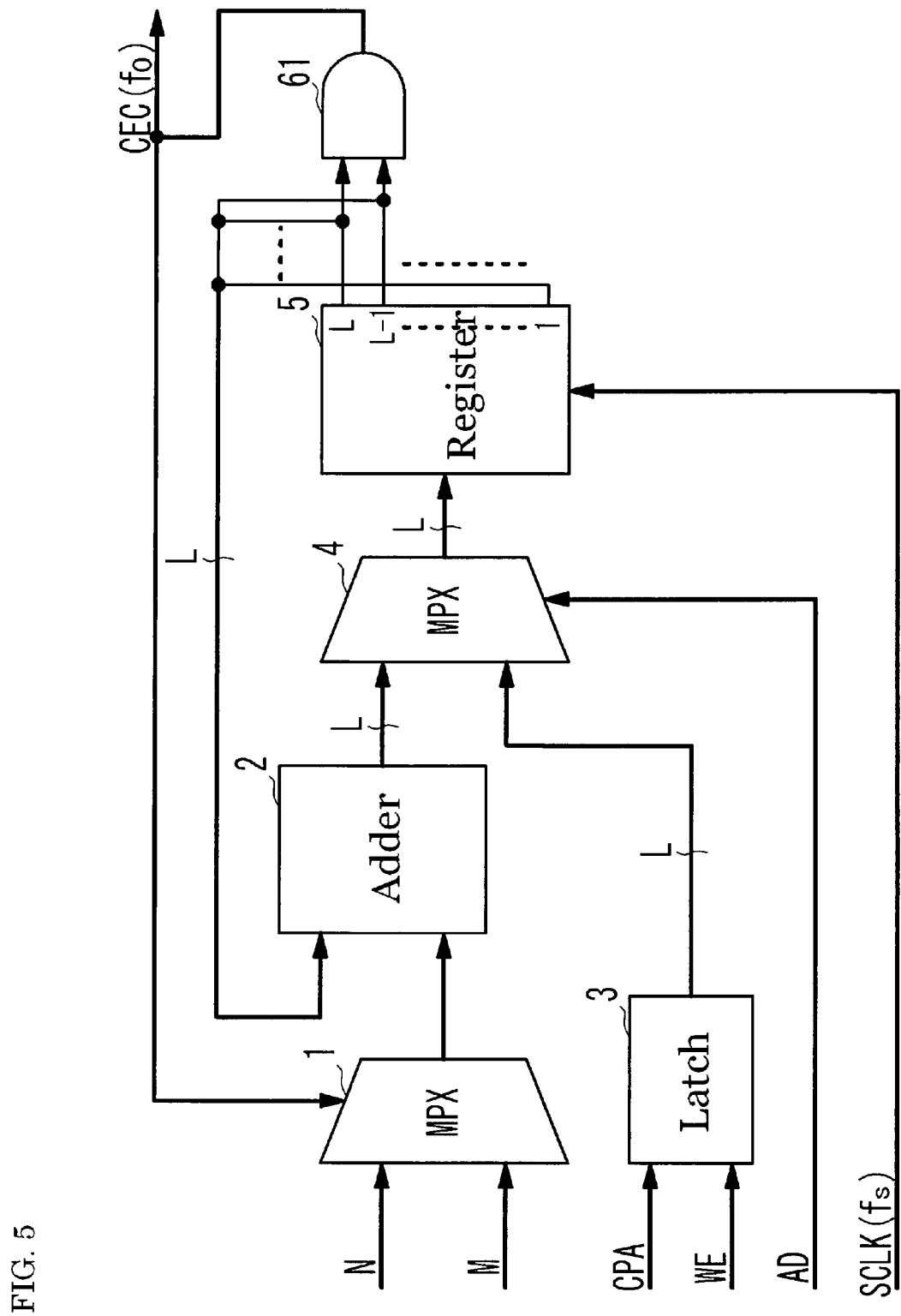
FIG. 5 is a block diagram illustrating a configuration of a code NCO according to a third embodiment.

FIG. 5 is a block diagram illustrating a configuration of the code NCO of this embodiment.

The code NCO of FIG. 5 has the same configuration as that of the code NCO of the first embodiment of FIG. 1, except that the comparator 6 of the code NCO of FIG. 1 is replaced by an AND operator 61.

The AND operator 61 receives an output of the most significant bit L of the register 5 and an output of the immediately less significant bit (L−1), and outputs the result of an AND operation of these inputs to the multiplexer 1. Specifically, the AND operator 61 outputs a signal having the High state "1" to the multiplexer 1 only when the input signal from the most significant bit L of the register 5 and the input signal from the immediately less significant bit (L−1) both have the High state "1". In the other states, the AND operator 61 outputs a signal having the Low state "0" to the multiplexer 1. The code NCO of this embodiment outputs, as a code enable signal, the signal output from the AND operator 61. Here, the AND operator 61 corresponds to the "select signal generator" of the present invention.

Figure 6:
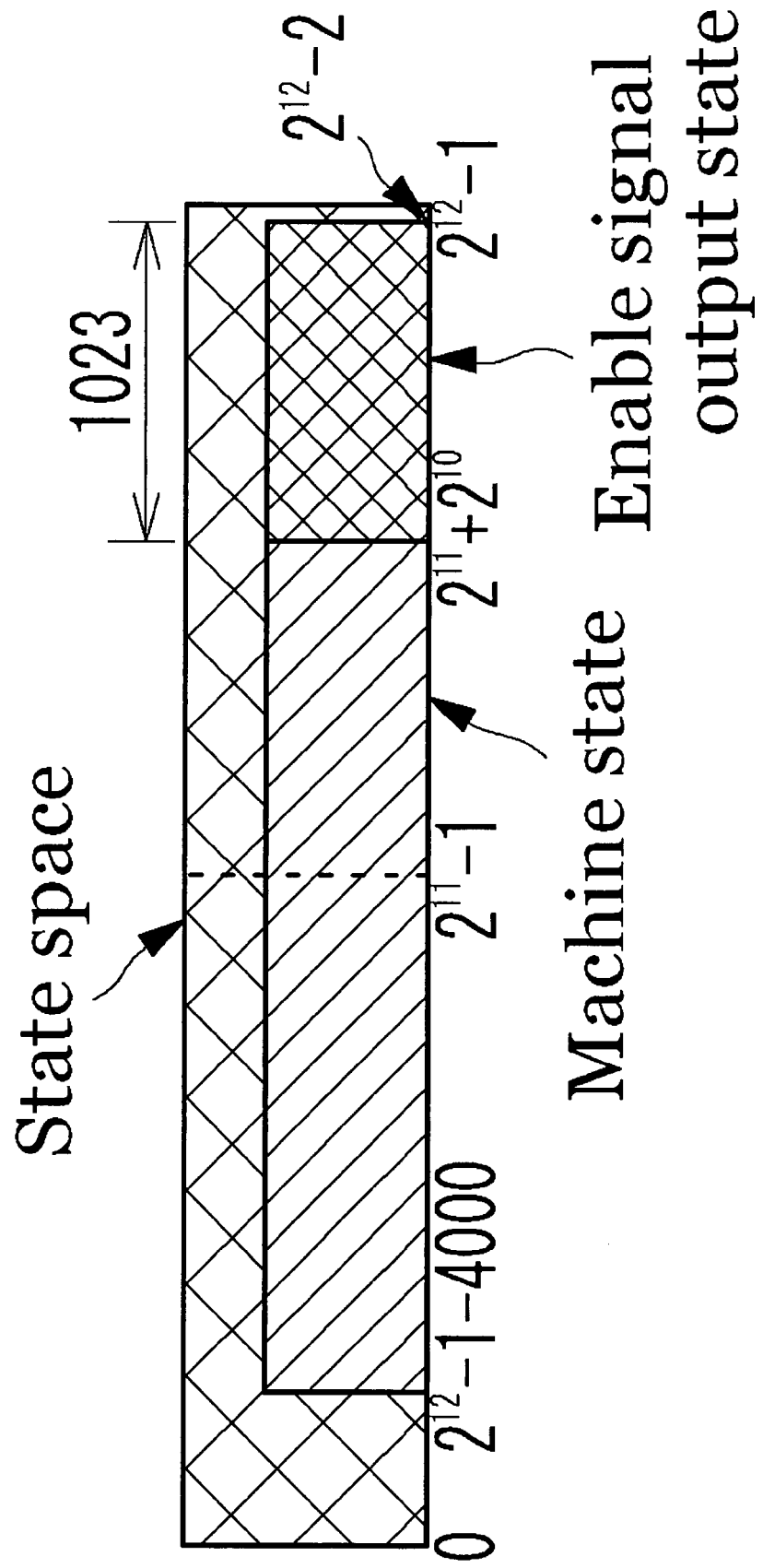
FIG. 6 is a state diagram illustrating a relationship between a state space, machine states, and states corresponding to code enable signals in the code NCO of the third embodiment.

FIG. 6 is a state diagram illustrating a relationship between a state space, machine states, and states corresponding to code enable signals in the code NCO of this embodiment. Note that, also in this example, it is assumed that L is 12, the sampling clock frequency $f_s$ is 40 MHz, the frequency $f_o$ of the code enable signal is 10.23 MHz, the integer N is 1023, and the integer M is 1119.

In the configuration of FIG. 5, as described above, when the most significant bit and the immediately less significant bit have the High state, a code enable signal having the High state "1" is output. Therefore, states indicating the output of a code enable signal are positioned as upper states $2^{11}$+$2^{10}$ (=3072) to $2^{12}$−2 (=4094) in the state space including 0 to $2^{12}$−1 (=4095). Machine states are positioned at $2^{12}$−1−4000 (=95) to $2^{12}$−2 (=4094). Also, the multiplexer 1 outputs an integer of 1023 when receiving a signal having the Low state "0", and an integer of 1119 when receiving a signal having the High state "1". Specifically, the multiplexer 1 outputs an integer of 1023 when the value of the output of the adder 2 latched with the clock frequency takes a state number of 95 to 3071, and an integer of 1119 when the value of the output of the adder 2 latched with the clock frequency takes a state number of 3072 to 4094.

The adder 2 adds either of the input integers of 1023 and 1119 to the output of the register 5. Therefore, the states of the machine states are normally transitioned in an increasing direction.

This operation is repeatedly executed, depending on the clock frequency. The AND operator 61 outputs a signal having the High state "1" every time the value of the output of the adder 2 latched with the clock frequency takes a state number of 3072 to 4094.

Note that, in the code NCO of this embodiment, the lowermost state of the machine states is 95 (=$2^{12}$−1−4000) as described above. Therefore, in the shift mode, the code phase can be accurately corrected by inputting an integer obtained by adding 95 to the phase adjustment value CPA. Specifically, when the number of bits is L and the integers input to the comparator are N and M, the code phase can be accurately corrected by adding $2^L$−1−M' to the phase adjustment value CPA.

With such a configuration, it is possible to achieve a code NCO having a simpler and optimal circuit configuration without employing a comparator.

Next, a code NCO according to a fourth embodiment will be described with reference to FIGS. 7 and 8.

Figure 7:
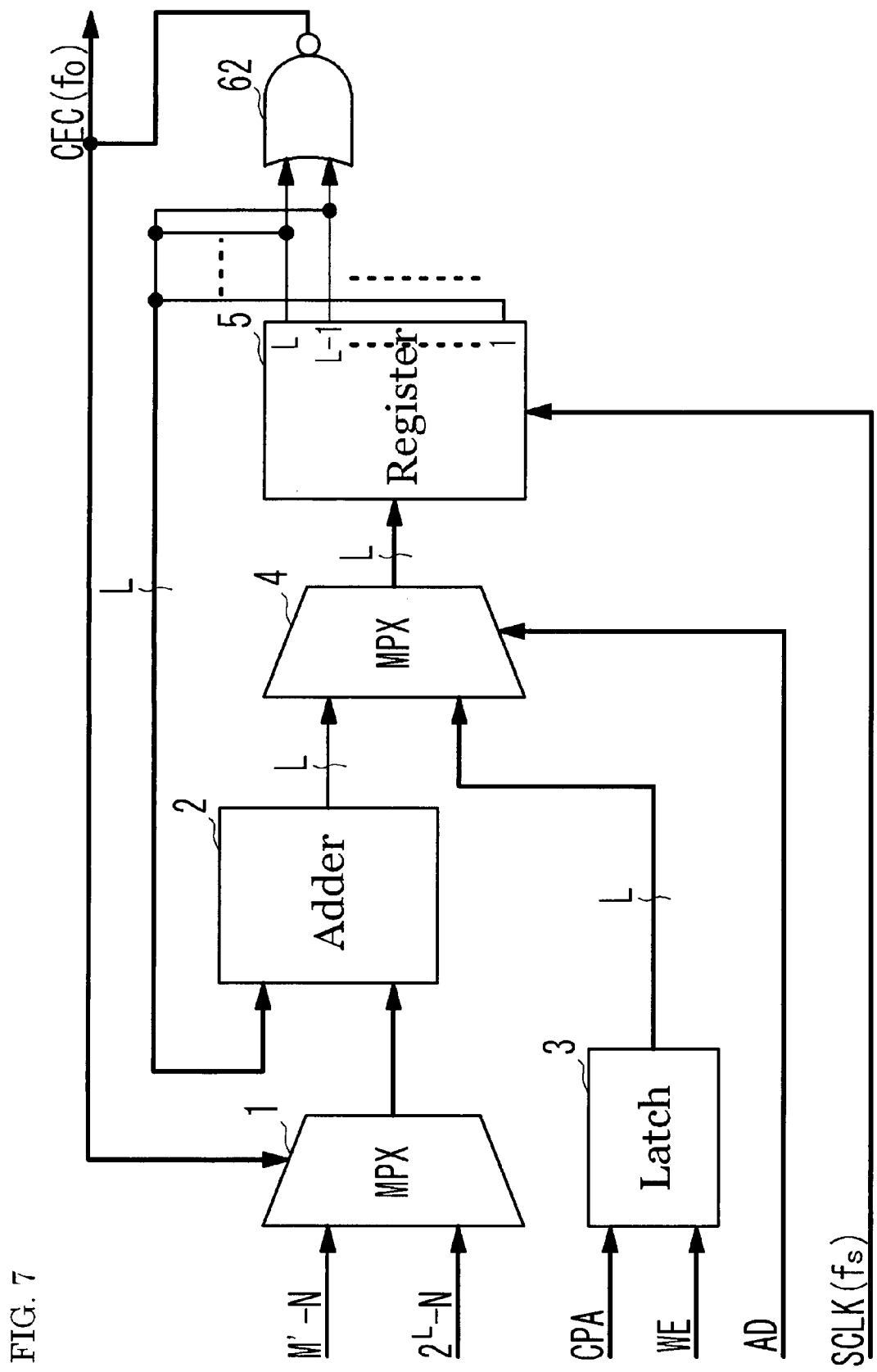
FIG. 7 is a block diagram illustrating a configuration of a code NCO according to a fourth embodiment.

FIG. 7 is a block diagram illustrating a configuration of the code NCO of this embodiment.

The code NCO of this embodiment is obtained by replacing the AND operator 61 of the code NCO of the third embodiment by a NOR operator 62, and the other portions of the configuration are the same as those of the code NCO of FIG. 5, except for values input to the multiplexer 1. Here, M'−N and $2^L$−N are input to the multiplexer 1 of FIG. 7 instead of M and N.

The NOR operator 62 receives an output of the most significant bit L of the register 5 and an output of the immediately less significant bit (L−1), and outputs the result of a NOR operation of these inputs to the multiplexer 1. Specifically, the NOR operator 62 outputs a signal having the High state "1" to the multiplexer 1 only when the input signal from the most significant bit L of the register 5 and the input signal from the immediately less significant bit (L−1) both have the Low state "0". In the other states, the NOR operator 62 outputs a signal having the Low state "0" to the multiplexer 1. The code NCO of this embodiment outputs, as a code enable signal, the signal output from the NOR operator 62. Here, the NOR operator 62 corresponds to the "select signal generator" of the present invention.

Figure 8:
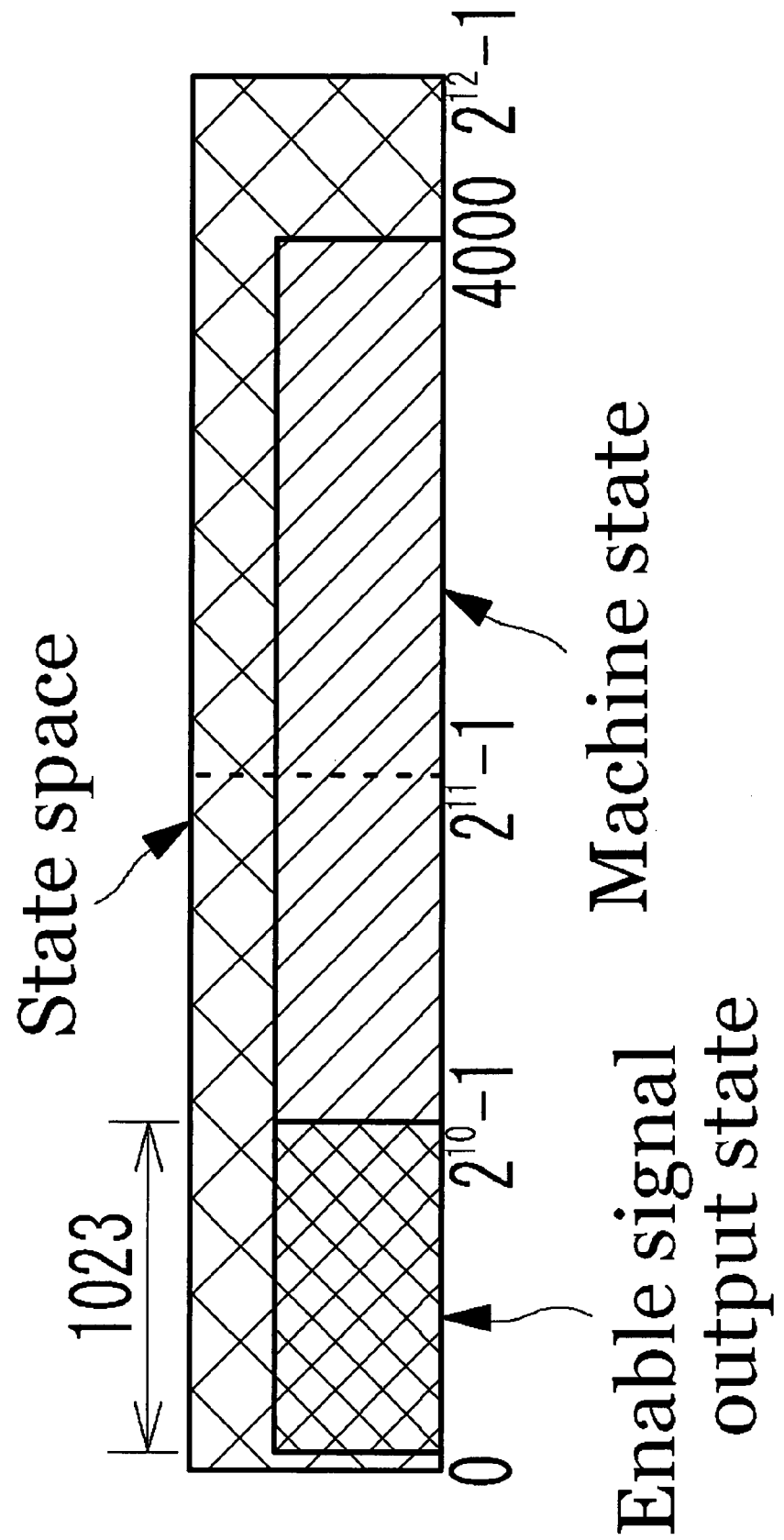
FIG. 8 is a state diagram illustrating a relationship between a state space, machine states, and states corresponding to code enable signals in the code NCO of the fourth embodiment.

FIG. 8 is a state diagram illustrating a relationship between a state space, machine states, and states corresponding to code enable signals in the code NCO of this embodiment. Note that, also in this example, it is assumed that L is 12, the sampling clock frequency $f_s$ is 40 MHz, the frequency $f_o$ of the code enable signal is 10.23 MHz, the integer N is 1023, and the integer M' is 4000.

In the configuration of FIG. 7, as described above, when the most significant bit and the immediately less significant bit have the Low state "0", a code enable signal having the High state "1" is output. Therefore, states indicating the output of a code enable signal are positioned as states 1 to $2^{10}-1$ (=1023) in the state space including 0 to $2^{12}-1$ (=4095). Machine states are positioned at 1 to 4000. Also, the multiplexer 1 outputs an integer of 2977 when receiving a signal having the High state "1", and an integer of 3073 when receiving a signal having the Low state "0". Specifically, the multiplexer 1 outputs an integer of 3073 when the value of the output of the adder 2 latched with the clock frequency takes a state number of 1024 to 4000, and an integer of 2977 when the value of the output of the adder 2 latched with the clock frequency takes a state number of 1 to 1023.

The adder 2 adds either of the input integers of 2977 and 3073 to the output of the register 5. Therefore, the states of the machine states are normally transitioned in a decreasing direction.

This operation is repeatedly executed, depending on the clock frequency. The NOR operator 62 outputs a signal having the High state "1" every time the value of the output of the adder 2 latched with the clock frequency takes a state number of 1 to 1023.

Note that, in the code NCO of this embodiment, the lowermost state of the machine states is 1 (=$2^{10}$–1023) as described above. Therefore, in the shift mode, the code phase can be accurately corrected by inputting an integer obtained by adding 1 to the phase adjustment value CPA. Specifically, when the number of bits is L and the integers input to the comparator are N and M, the code phase can be accurately corrected by adding $2^{L-2}$–N to the phase adjustment value CPA.

With such a configuration, as is similar to the third embodiment, it is possible to achieve a code NCO having a simpler and optimal circuit configuration without employing a comparator.

Next, a code NCO according to a fifth embodiment will be described with reference to FIGS. 9 and 10.

Figure 9:
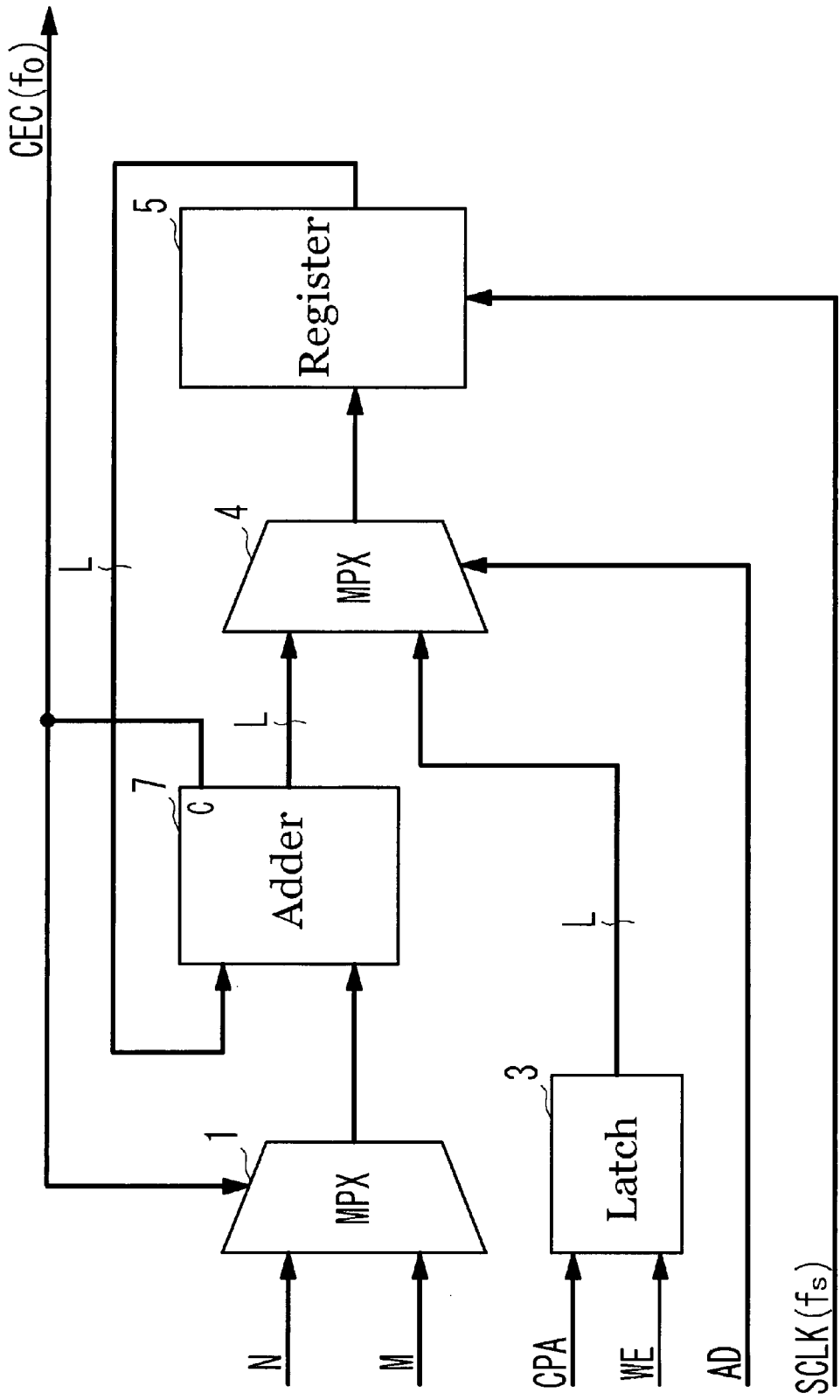
FIG. 9 is a block diagram illustrating a configuration of a code NCO according to a fifth embodiment.

FIG. 9 is a block diagram illustrating a configuration of the code NCO of this embodiment.

The code NCO of FIG. 9 comprises multiplexers (MPXs) 1 and 4, an adder 7, a latch circuit 3, a register 5, and a comparator 6. The multiplexers 1 and 4, the adder 7, the latch circuit 3, and the register 5 each have an L-bit digital operation circuit.

The multiplexer 1 receives two integers N and M which are relatively prime, and also receives a carrier signal from the adder 7. The multiplexer 1 outputs either of the two integers N and M in accordance with the carrier signal. For example, in this embodiment, the multiplexer 1 outputs the integer N when the carrier signal is in the High state "1", and the integer M when the carrier signal is in the Low state "0". Here, the multiplexer 1 corresponds to the "first multiplexer" of the present invention, and the carrier signal corresponds to the "select signal" of the present invention.

The adder 7 adds an integer output from the multiplexer 1 to an output value from the register, and outputs the result. Also, the adder 7 outputs the carrier signal having two values (the High state and the Low state) to the multiplexer 1, depending on the result of the addition. Specifically, when the addition result reaches the upper limit of the state space represented by the number of bits and moves to the lower side, the adder 7 outputs a carrier signal having the High state "1" to the multiplexer 1. When the addition result does not reach the upper limit of the state space represented by the number of bits, the adder 7 outputs a carrier signal having the Low state "0" to the multiplexer 1. In other words, if an integer after the addition is smaller than an integer before the addition, the adder 7 outputs a carrier signal having the High state "1". If an integer after the addition is larger than an integer before the addition, the adder 7 outputs a carrier signal having the Low state "0".

The latch circuit 3 receives a phase adjustment value CPA (Code Phase Adjustment) for controlling a code phase, and a write enable signal WE, and outputs the phase adjustment value CPA with timing of the write enable signal WE.

The multiplexer 4 receives an output value of the adder 7 and an output value (the phase adjustment value CPA) from the latch circuit 3, and also receives an adjust timing signal AD (Adjust Timing). With timing given by the adjust timing signal AD, the multiplexer 4 outputs either of the output value from the adder 7 and the output value from the latch circuit 3. Specifically, with timing when the adjust timing signal AD is input, the multiplexer 4 outputs the phase adjustment value CPA (shift mode), and with the other timing, the multiplexer 4 outputs the output value from the adder 7 (normal mode). Here, the multiplexer 4 corresponds to the "second multiplexer" of the present invention.

The register 5 receives an output value of the multiplexer 4 and a clock signal. The register 5 latches and outputs the output value of the multiplexer 4 to the adder 7, depending on the clock frequency $f_s$ of the sampling clock signal.

Note that, also in the code NCO of this embodiment, the integers N and M and the number L of bits are set from the clock frequency $f_s$ and the frequency $f_o$ of a code enable signal to be obtained, as in the first embodiment.

By provided such settings and using the configuration of FIG. 9, the carrier signal of the adder 7 goes to the High state "1" in cycles corresponding to the frequency $f_o$ in the normal mode (a specific operation will be next described). As a result, by extracting the carrier signal output from the adder 7, a code enable signal having the desired frequency $f_o$ can be output. On the other hand, in the shift mode, a state movement amount is adjusted, depending on the amount of a shift in the code phase, thereby executing phase adjustment.

Here, an operation of the code NCO of FIG. 9 when the integers N and M, the number L of bits, the clock frequency $f_s$, the frequency $f_o$ of the code enable signal are specifically set, will be described. For example, a description will be given, assuming that the clock frequency $f_s$ is 40 MHz, and a code enable signal having a frequency $f_o$ of 10.23 MHz is generated and output.

From expression (4), if the integer N is set to be 1023, the integer M' is set to be 4000. Also, from expression (5), L is defined so that M' is the maximum integer which does not exceed $2^L$. Therefore, since M' is 4000, L is set to be 12. From expression (6), M is set to be 1119.

Figure 10:
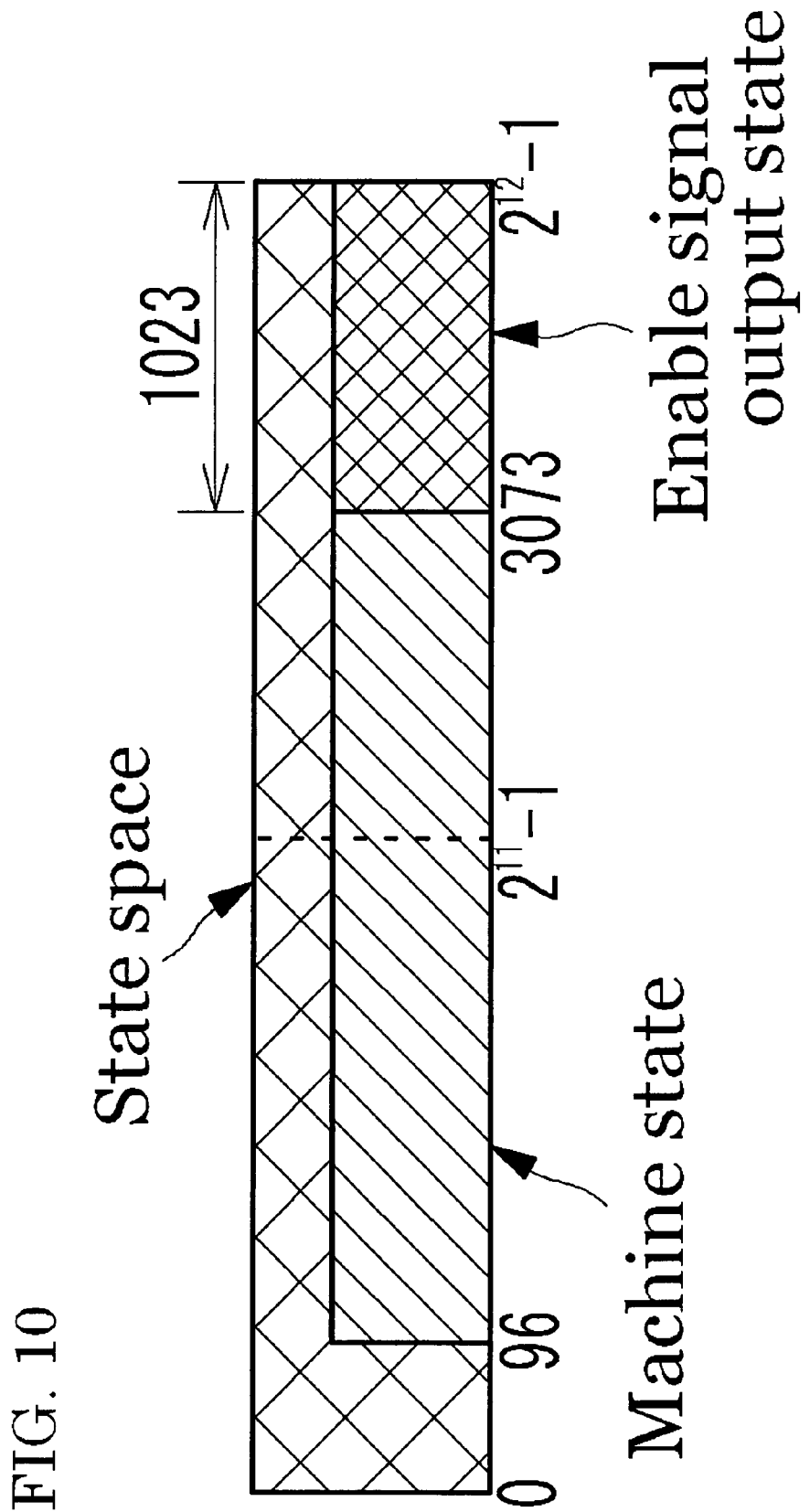
FIG. 10 is a state diagram illustrating a relationship between a state space, machine states, and states corresponding to code enable signals in the code NCO of the fifth embodiment.

A relationship between a state space, machine states, and states corresponding to code enable signals in such a case is illustrated in FIG. 10.

FIG. 10 is a state diagram illustrating the relationship between the state space, the machine state, and the state corresponding to the code enable signal in the code NCO of this embodiment.

As illustrated in FIG. 10, each circuit constituting element of the code NCO of FIG. 9 has the number L of bits which is 12. Therefore, the whole state space has 4096 (=$2^{12}$) states. Since the clock frequency $f_s$ is 40 MHz, the total number of machine states is 4000. The number of states corresponding to the frequency $f_o$ of the code enable signal is represented by 1023 states within the 4000 machine states. Also, the adder 7, when detecting the most significant bit (the upper limit of the state space), outputs a carrier signal having the High state "1"

and transitions from the most significant bit to the least significant bit, so that the uppermost state of the 4000 machine states is positioned at the uppermost position 4095. Further, the code NCO of this embodiment outputs this carrier signal as a code enable signal. Therefore, the states corresponding to the code enable signals are represented by states higher than or equal to a threshold of 2977 (2977 to 3999) of the 4000 machine states, which specifically correspond to the uppermost 1023 states (i.e., states 3073 to 4095) in the state space.

Also, the multiplexer 1 outputs the integer N (1023) to the adder 7 when receiving a select signal having the Low state "0", and the integer M (1119) to the adder 7 when receiving a select signal having the High state "1". Either of the integers of 1023 and 1119 input to the adder 7 is added to the output of the register 5. Therefore, the states of the machine states are normally transitioned in an increasing direction.

With such a configuration, when the output of the adder 7 in states 3073 to 4095 (uppermost) is latched with the clock frequency, the adder 7 outputs a carrier signal having the High state "1". Specifically, when the addition result of the adder 7 falls within states 3073 to 4095 and is latched by the register 5, the adder 7 outputs a carrier signal having the Low state "0". At this time, the integer N (=1023) is input to the adder 7, and the adder 7 adds the integer N (=1023) to the integer latched by the register 5. As a result, the sum value reaches the upper limit (4095) of the state space, so that the adder 7 outputs a carrier signal having the High state "1", and adds the integer M (=1119) newly input from the multiplexer 1 to the integer latched by the register 5. Thereby, the machine state is transitioned from states 3073 to 4095 to states 96 to 1118. Thereafter, the integer N (=1023) continues to be added until the result of addition by the adder 7 reaches an integer of states 3073 to 4095 again.

This operation is repeatedly executed, depending on the clock frequency. The adder 7 outputs a carrier signal having the High state "1" every time the value of the output of the adder latched with the clock frequency takes an integer value of states 3073 to 4095. Thereby, a code enable signal having a predetermined frequency $f_o$ can be generated and output.

Note that, in the code NCO of this embodiment, the lowermost state of the machine states is 96 as described above. Therefore, in the shift mode, the code phase can be accurately corrected by inputting an integer obtained by adding 96 to the phase adjustment value CPA.

With such a configuration, an effect similar to that of the first embodiment can be obtained. In addition, since the code NCO of this embodiment is obtained by removing a comparator from the first embodiment, the size of the code NCO can be reduced.

Next, a code NCO according to a sixth embodiment will be described with reference to FIGS. 11 and 12.

Figure 11:
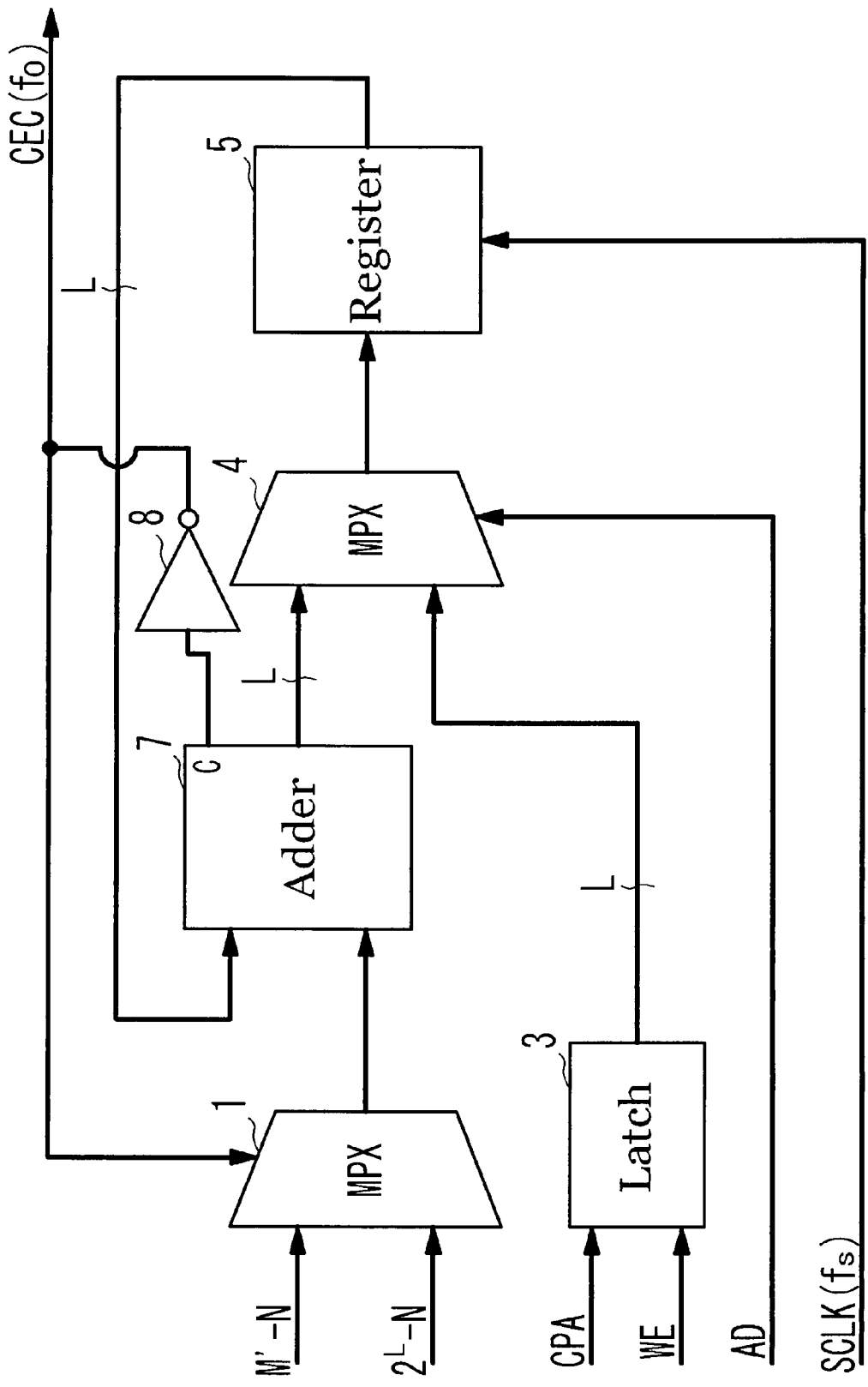
FIG. 11 is a block diagram illustrating a configuration of a code NCO according to a sixth embodiment.

FIG. 11 is a block diagram illustrating a configuration of the code NCO of this embodiment.

The code NCO of FIG. 11 have the same configuration as that of the code NCO of the fifth embodiment of FIG. 9, except that an inverter circuit 8 is provided at a carrier signal output portion of the adder 7, and an integer (M'−N) and an integer ($2^L$−N) are input to the multiplexer 1.

In the code NCO of this embodiment, the multiplexer 1 receives the integer (M'−N) and the integer ($2^L$−N). In this case, the multiplexer 1 outputs the integer (M'−N) when receiving a select signal having the High state "1" from the inverter 8, and the integer ($2^L$−N) when receiving a select signal having the Low state "0" from the inverter 8.

Figure 12:
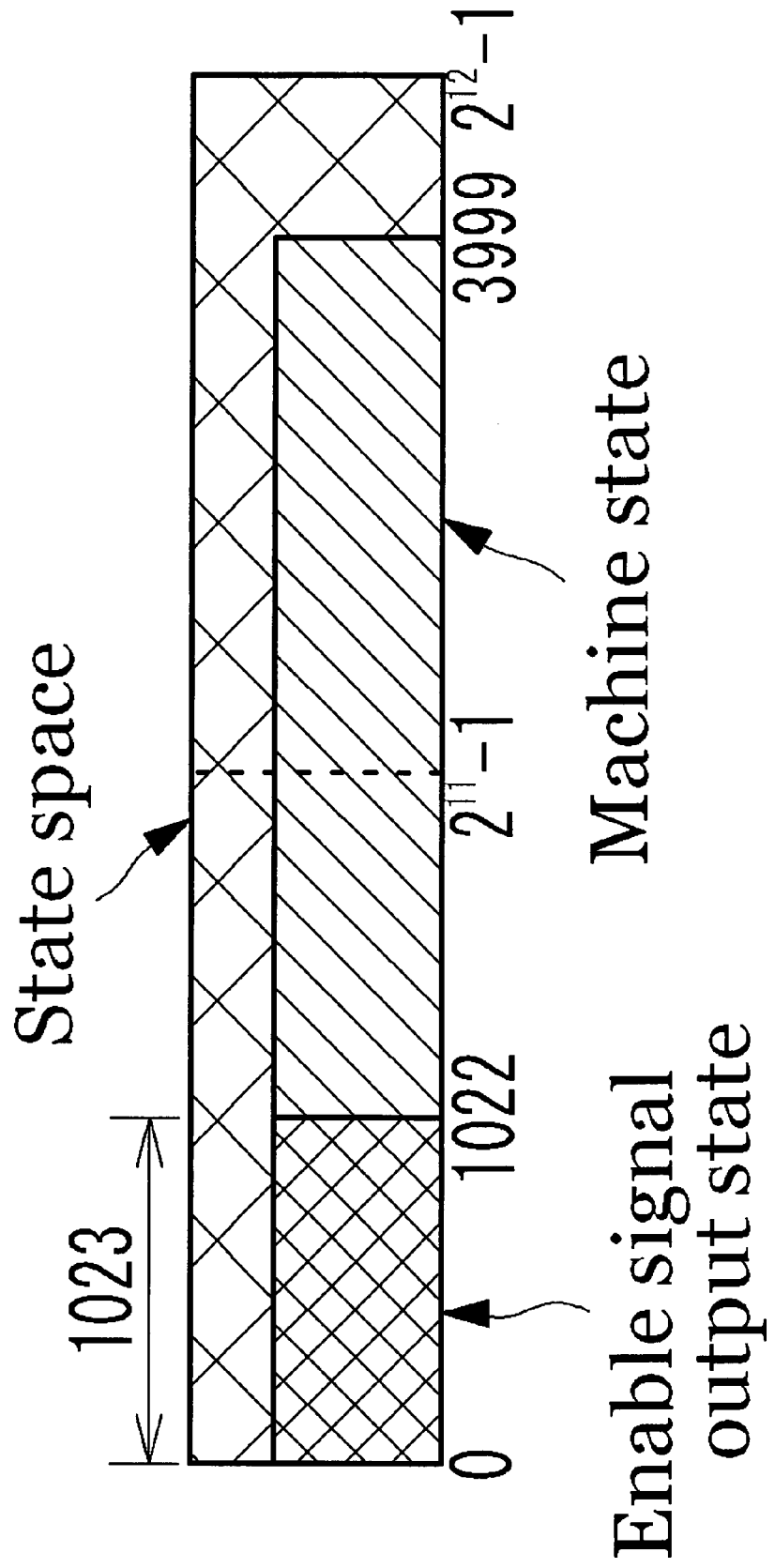
FIG. 12 is a state diagram illustrating a relationship between a state space, machine states, and states corresponding to code enable signals in the code NCO of the sixth embodiment.

A relationship between a state space, machine states, and states corresponding to code enable signals in the code NCO having such a configuration is illustrated in FIG. 12.

FIG. 12 is a state diagram illustrating the relationship between the state space, the machine state, and the state corresponding to the code enable signal in the code NCO of this embodiment. Note that, also in this example, it is assumed that L is 12, the sampling clock frequency $f_s$ is 40 MHz, the frequency $f_o$ of the code enable signal is 10.23 MHz, the integer N is 1023, and the integer M' is 4000.

As illustrated in FIG. 12, each circuit constituting element of the code NCO of FIG. 11 has the number L of bits which is 12. Therefore, the whole state space has 4096 (=$2^{12}$) states. Since the clock frequency $f_s$ is 40 MHz, the total number of machine states is 4000. The number of states corresponding to the frequency $f_o$ of the code enable signal is represented by 1023 states within the 4000 machine states.

Also, the adder 7, when detecting the most significant bit (the upper limit of the state space), outputs a carrier signal having the High state "1" and transitions from the most significant bit to the least significant bit. Therefore, when such an operation is executed, a select signal having the Low state "0" is input from the inverter 8 to the multiplexer 1. In this case, the multiplexer 1 outputs the integer value of $2^L$−N (=3073). On the other hand, when the adder 7 does not detect the most significant bit (the upper limit of the state space) and does not output a carrier signal having the High state "1", i.e., the adder 7 outputs a carrier signal having the Low state "0", a select signal having the High state "1" is input from the inverter 8 to the multiplexer 1. In this case, the multiplexer 1 outputs the integer value of M'−N (=2977). Thereby, when an integer latched by the register 5 is present in states 1023 to 3999, a carrier signal having the High state "1" (a select signal having the Low state "0") is output to the multiplexer 1, and when the integer latched by the register 5 is present in states 0 to 1022, a carrier signal having the Low state "0" (a select signal having the High state "1") is output to the multiplexer 1.

As a result, the lowermost state 0 of the 4000 machine states is positioned at the lowermost state 0 in the state space, and states corresponding to code enable signals are represented by states smaller than a threshold of 1023 (0 to 1022) within the 4000 machine states, which specifically correspond to lowermost 1023 states (i.e., states 0 to 1022) in the state space.

Also, by executing such an operation, when an integer latched by the register 5 is present in states 1023 to 3999, the states of the machine states are transitioned in a decreasing direction. When the integer latched by the register 5 is present in states 0 to 1022, the states of the machine states are transitioned in an increasing direction. This operation is repeatedly executed. The adder 7 outputs a carrier signal having the Low state "0" every time the value of the output of the adder 7 latched with the clock frequency takes a state number of 0 to 1022. Thereby, a select signal having the High state "1" is output from the inverter 8, so that a code enable signal having the predetermined frequency $f_o$ can be generated and output.

With such a configuration, an effect similar to that of the code NCO of the fifth embodiment described above can be obtained.

When a code NCO has a circuit configuration as described in this embodiment (sixth embodiment) or the fifth embodiment, the state movement direction can be easily reversed only by changing the setting conditions, i.e., the input integers and the threshold conditions. Thereby, high-precision code phase observation can be achieved using the configurations of the two embodiments of the present invention no matter which of the directions the state movement direction of conventional code NCOs is. As a result, high-precision code phase observation is easily achieved only by changing the setting conditions, depending on the specification of a conventionally used GPS receiver, thereby facilitating an improvement in the conventional GPS receiver.

Next, a code NCO according to a seventh embodiment will be described with reference to FIGS. 13 and 14.

Figure 13:
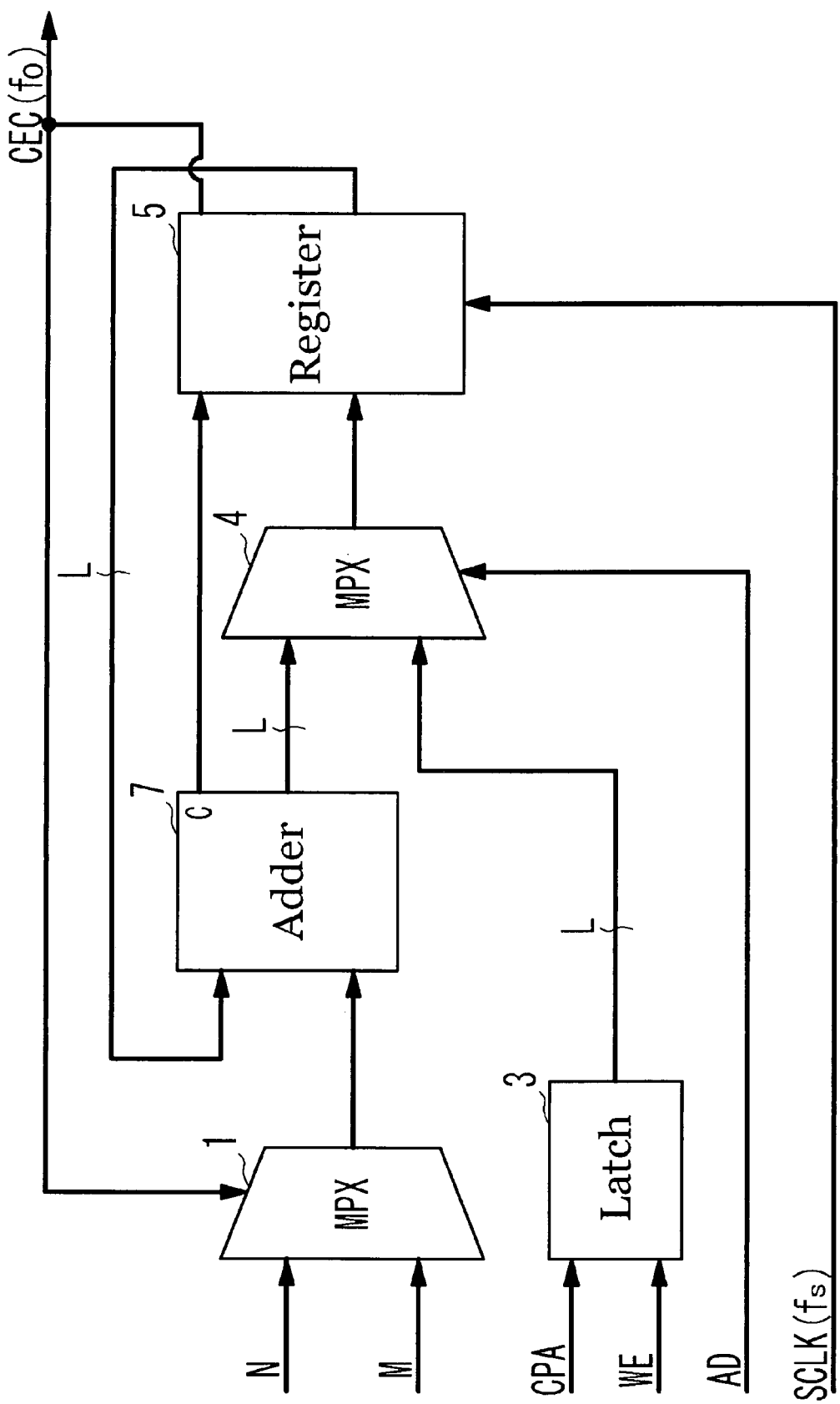
FIG. 13 is a block diagram illustrating a configuration of a code NCO according to a seventh embodiment.
Figure 14:
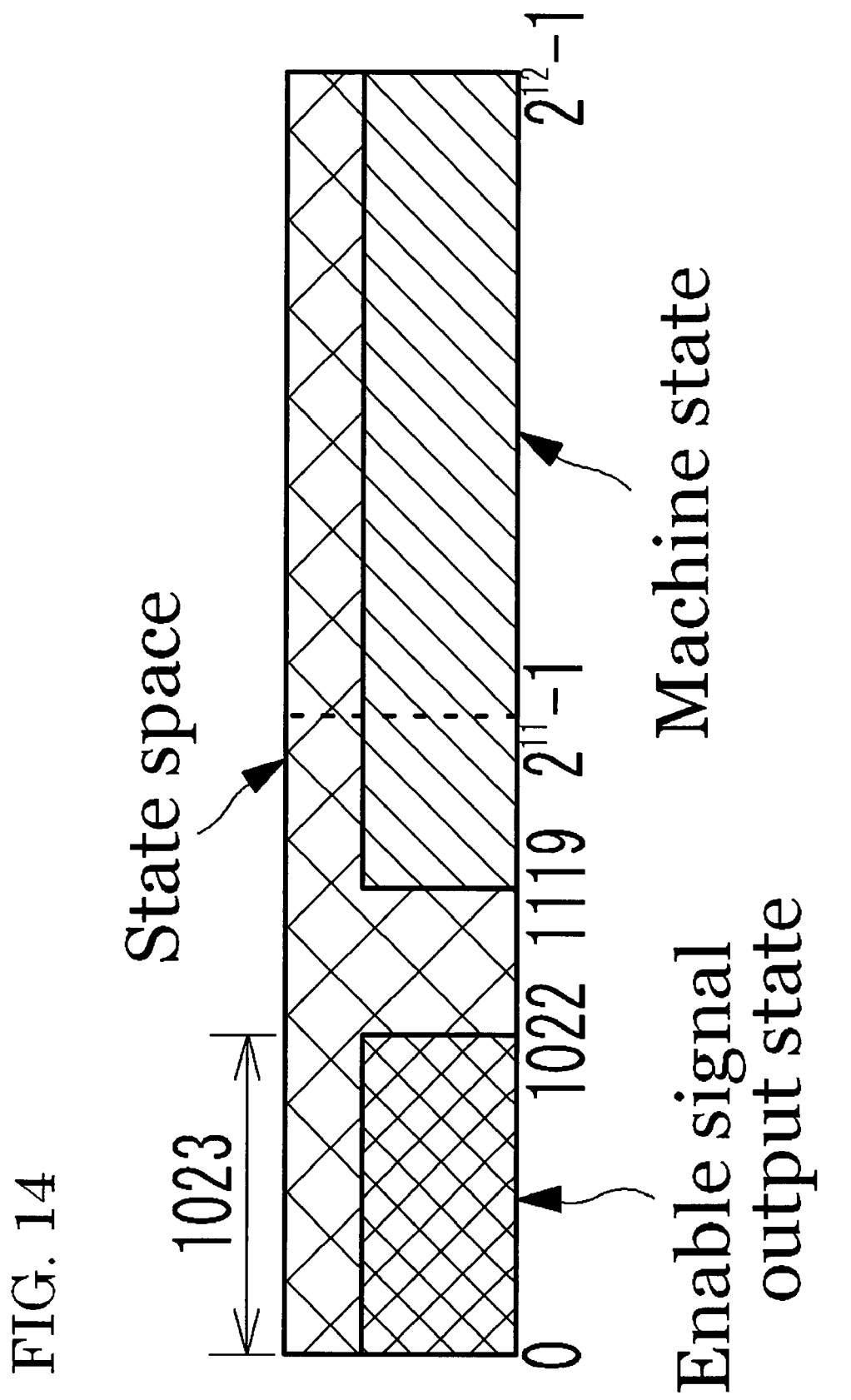
FIG. 14 is a state diagram illustrating a relationship between a state space, machine states, and states corresponding to code enable signals in the code NCO of the seventh embodiment.

FIG. 13 is a block diagram illustrating a configuration of the code NCO of this embodiment. FIG. 14 is a state diagram illustrating a relationship between a state space, machine states, and states corresponding to code enable signals in the code NCO of FIG. 13. Note that, also in this example, it is assumed that L is 12, the sampling clock frequency $f_s$ is 40 MHz, the frequency $f_o$ of the code enable signal is 10.23 MHz, the integer N is 1023, and the integer M'is 4000.

As illustrated in FIG. 13, the code NCO of this embodiment has the same configuration as that of the code NCO of the fifth embodiment, except that a carrier signal output from an adder 7 is latched by a register 5 before being output to a multiplexer 1.

In the code NCO having such a configuration, the timing with which a carrier signal having the High state "1" is output to the multiplexer 1 is delayed by one timing of the sampling clock signal SCLK with respect to the code NCO of the third embodiment. Therefore, in this configuration, machine states are 0 to 1022 and 1119 to 4095 ($=2^{12}-1$), and states with timing when a code enable signal having the High state "1" is output are 0 to 1022. With the configuration of this embodiment, an effect similar to that of the fifth embodiment can be obtained.

Next, a code NCO according to an eighth embodiment will be described with reference to FIGS. 15 and 16.

Figure 15:
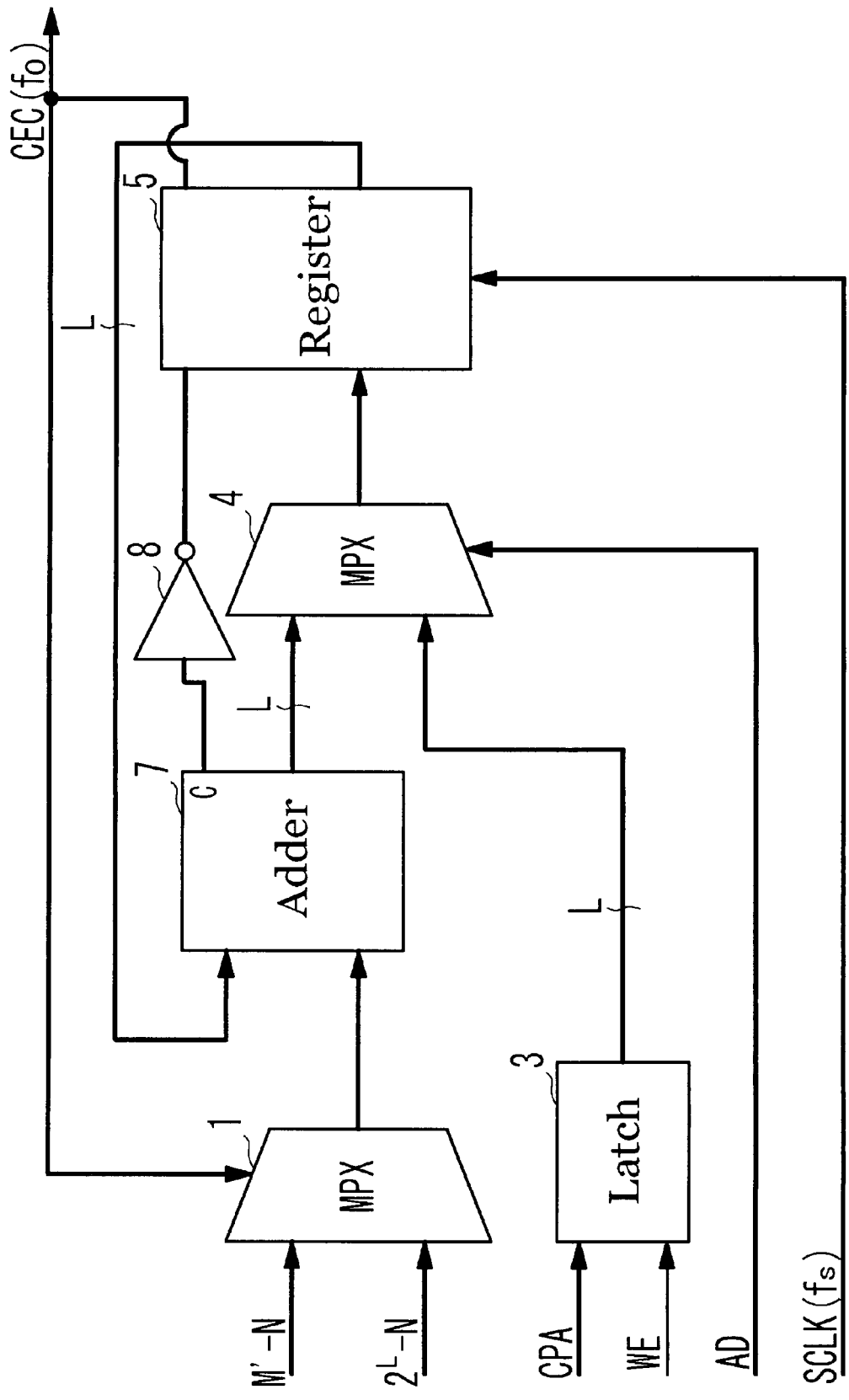
FIG. 15 is a block diagram illustrating a configuration of a code NCO according to an eighth embodiment.
Figure 16:
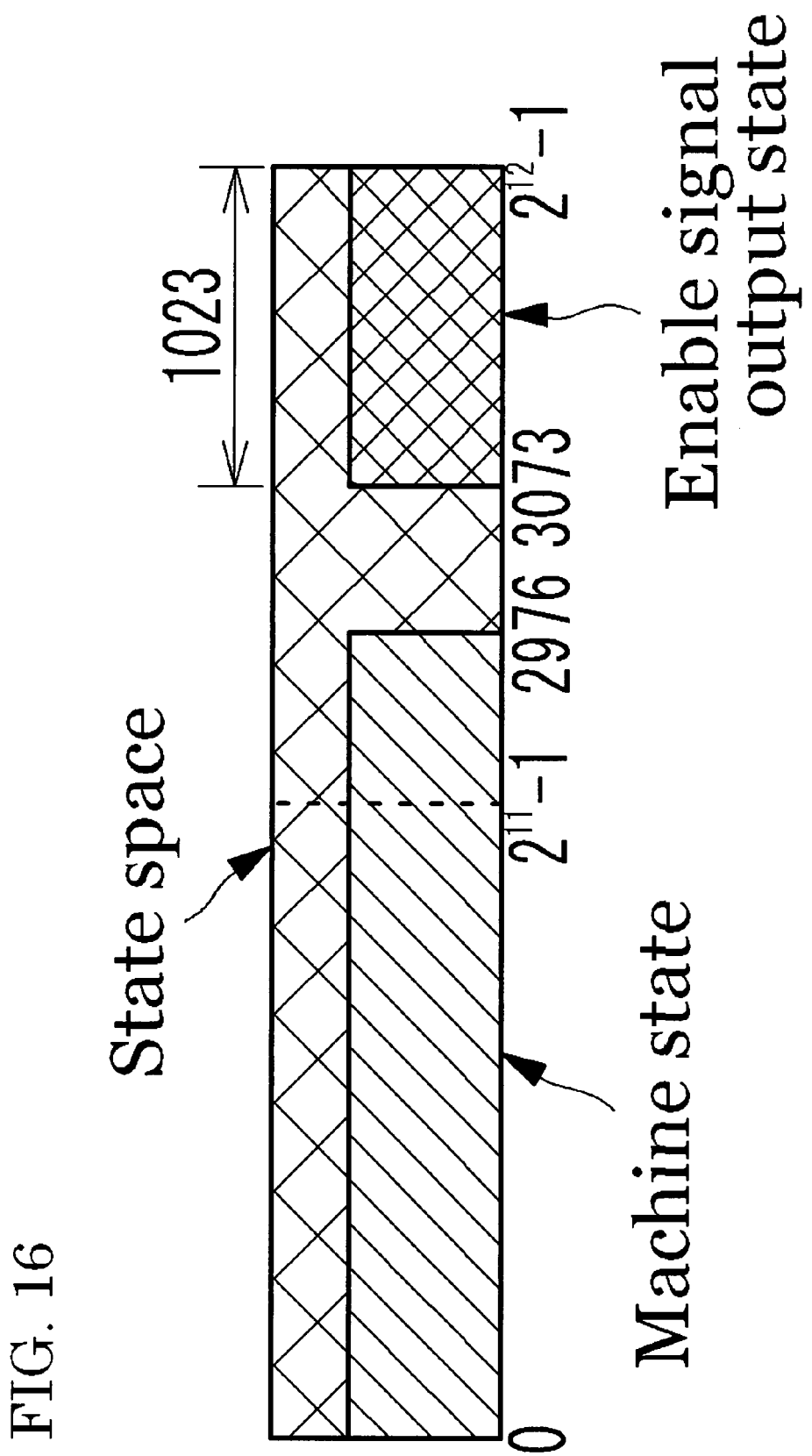
FIG. 16 is a state diagram illustrating a relationship between a state space, machine states, and states corresponding to code enable signals in the code NCO of the eighth embodiment.

FIG. 15 is a block diagram illustrating a configuration of the code NCO of this embodiment. FIG. 16 is a state diagram illustrating a relationship between a state space, machine states, and states corresponding to code enable signals in the code NCO of FIG. 15. Note that, also in this example, it is assumed that L is 12, the sampling clock frequency $f_s$ is 40 MHz, the frequency $f_o$ of the code enable signal is 10.23 MHz, the integer N is 1023, and the integer M' is 4000.

As illustrated in FIG. 15, the code NCO of this embodiment has the same configuration as that of the code NCO of the fourth embodiment, except that a select signal output from an inverter 8 is latched by a register 5 before being output to a multiplexer 1.

In the code NCO having such a configuration, the timing with which a select signal having the High state "1" is output to the multiplexer 1 is delayed by one timing of the sampling clock signal SCLK with respect to the code NCO of the fourth embodiment. Therefore, in this configuration, machine states are 0 to 2976 and 3073 to 4095 ($=2^{12}-1$), and states with timing when a code enable signal having the High state "1" is output are 3073 to 4095 ($=2^{12}-1$). With the configuration of this embodiment, an effect similar to that of the sixth embodiment can be obtained.

In the specific description of the code NCO of each embodiment above, it has been assumed that the sampling clock frequency $f_s$ is 40 MHz, and the frequency $f_o$ of the code enable signal is 10.23 MHz. In the configuration of each embodiment above, by providing setting conditions (the integers N and M and the number L of bits) as appropriate, a code NCO which employs a sampling clock signal having a frequency higher than a predetermined frequency of a code enable signal can be implemented by an optimal circuit configuration, depending on frequency conditions set for these signals.

Next, a GPS receiver according to a ninth embodiment will be described with reference to FIG. 17.

Figure 17:
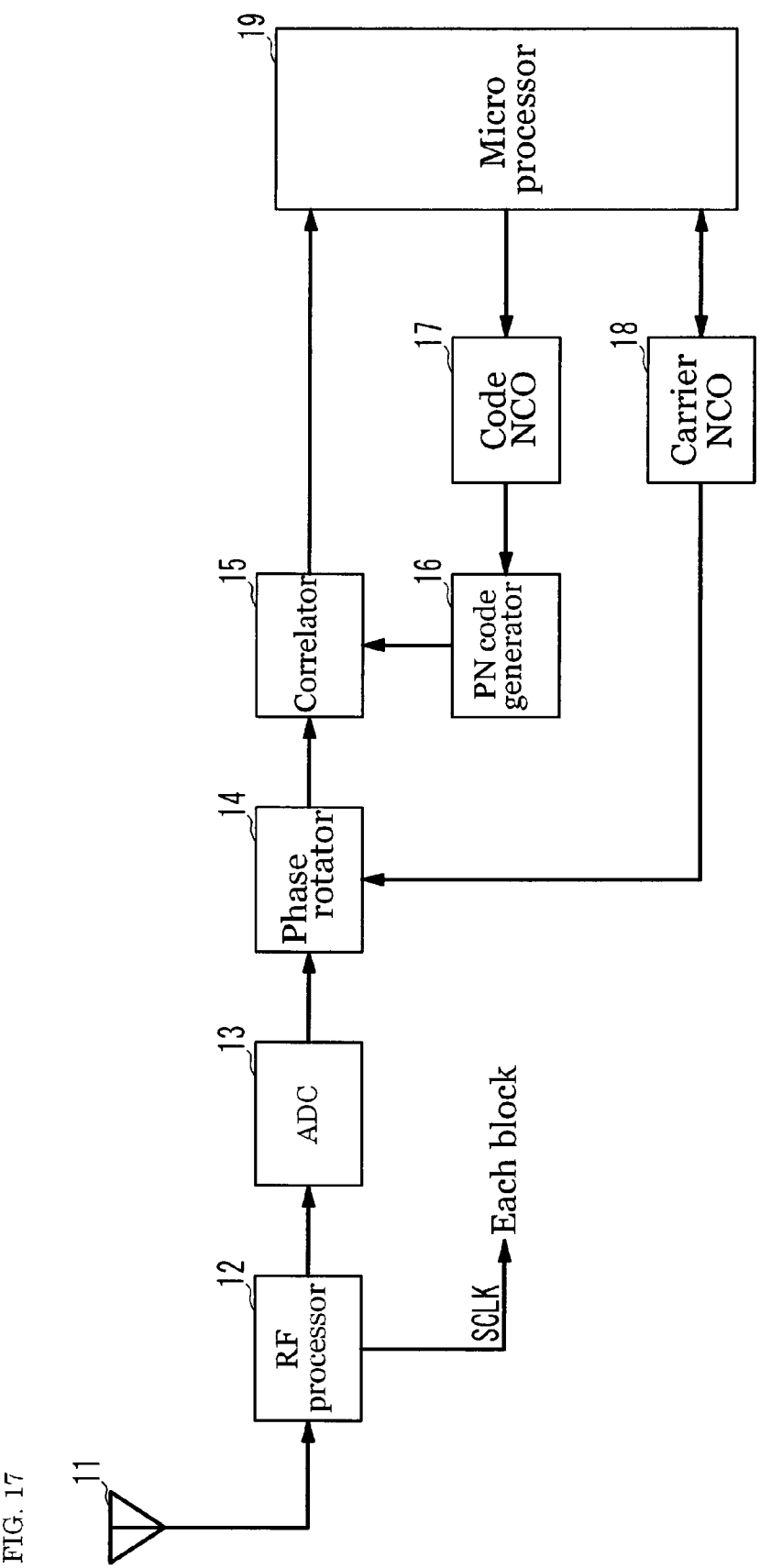
FIG. 17 is a block diagram illustrating a configuration of a GPS receiver according to a ninth embodiment.
Figure 18:
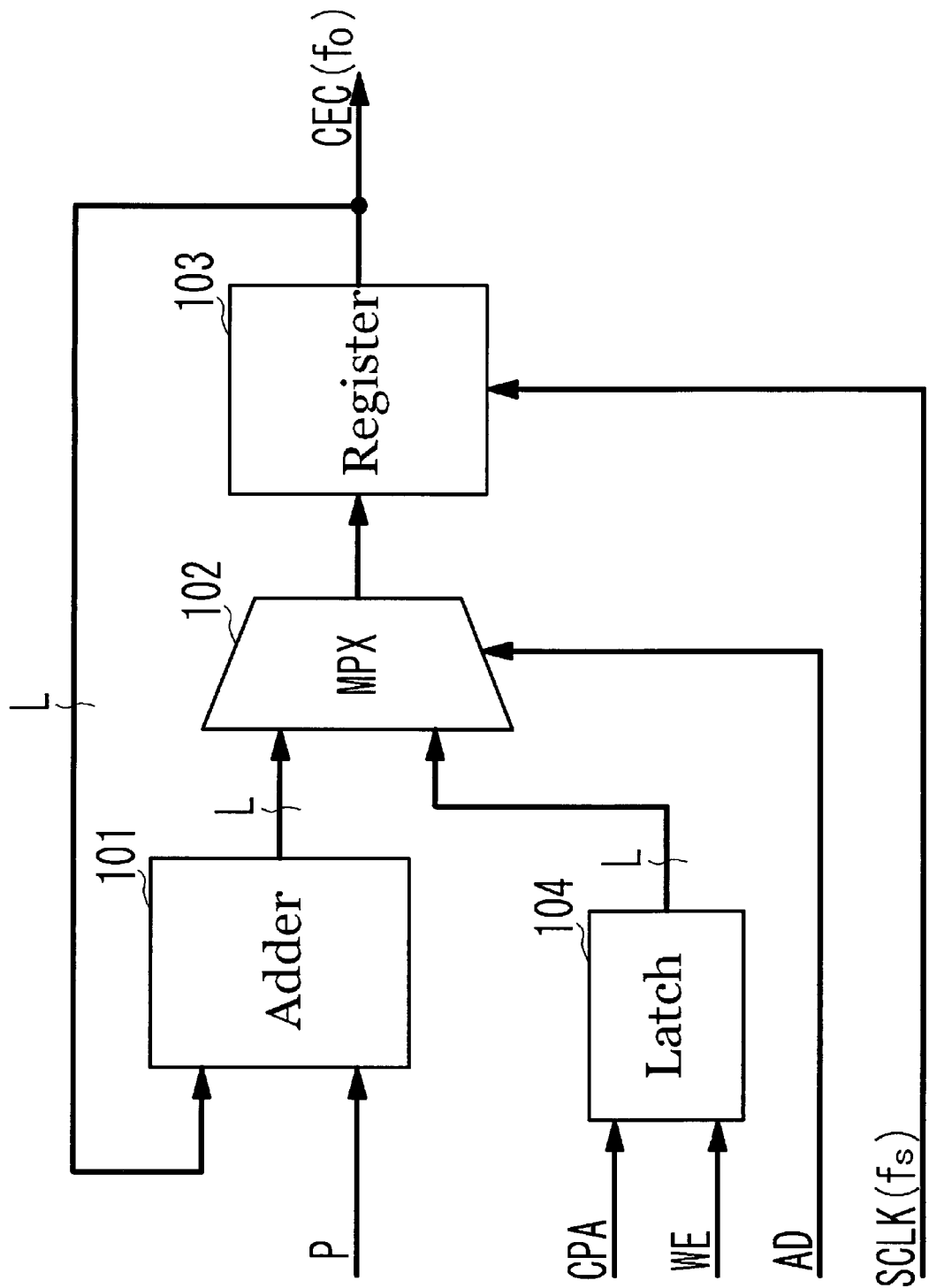
FIG. 18 is a block diagram schematically illustrating a conventional general code NCO.

FIG. 17 is a block diagram illustrating a configuration of the GPS receiver of this embodiment.

As illustrated in FIG. 17, the GPS receiver of this embodiment comprises an antenna 11, an RF processor 12, an A/D converter 13, a phase rotator 14, a correlator 15, a PN code generator 16, a code NCO 17, a carrier NCO 18, and a microprocessor 19.

The antenna 11 receives a GPS signal including L1 waves and L2 waves, and outputs the GPS signal to the RF processor 12. The RF processor 12 converts the received GPS signal into an in-phase signal and a quadrature signal having an intermediate frequency, and outputs the in-phase signal and the quadrature signal to the A/D converter 13. Also, the RF processor 12 detects a sampling clock signal from the received GPS signal, and outputs the sampling clock signal to each block. The A/D converter 13 subjects the received in-phase signal and quadrature signal to A/D conversion, and outputs the resultant signals to the phase rotator 14.

The phase rotator 14 converts the received digital in-phase signal and quadrature signal into an in-phase signal and a quadrature signal in a base band, based on a carrier phase input from the carrier NCO 18, and outputs the resultant signals to the correlator 15. The correlator 15 comprises correlation processors the number of which corresponds to the number of GPS satellites. The correlator 15 executes a correlation process based on a PN code output from the PN code generator 16 to estimate a carrier phase error and a code phase error, and outputs these errors to the microprocessor 19. The microprocessor 19 uses the received carrier phase error and code phase error to estimate a carrier phase and a code phase (pseudorange) and execute positioning, and outputs the results to a display section or the like (not shown).

The code NCO 17 is operated in accordance with a control signal relating to a code phase error input from the microprocessor 19, and executes a predetermined loop process to generate and output a code enable signal having a predetermined frequency to the PN code generator 16. The PN code generator 16 outputs a previously stored C/A code or P(Y) code to each correlation processor of the correlator 15 in accordance with the code enable signal.

The carrier NCO 18 calculates a carrier phase based on the control signal relating to a carrier phase error input from the microprocessor 19, and outputs the carrier phase to the phase rotator 14.

As the code NCO 17 of such a GPS receiver, the code NCO of each embodiment above is employed. Thereby, a code enable signal is generated with high precision and correctly, so that the PN code generator 16 can output a highly precise and correct PN code to the correlator 15. As a result, the correlator 15 can estimate a code phase and a carrier phase with high precision and correctly. Also, a code NCO having a minimum-size and optimal circuit configuration can be achieved, depending on desired frequency conditions. Therefore, a compact GPS receiver having a high-precision and optimal circuit configuration can be formed, depending on desired conditions.

Further, the state movement direction of the code NCO can be arbitrarily selected. Therefore, even when only a code NCO in a conventional GPS receiver is adapted, the estimation operation of a carrier phase, the estimation operation of a code phase, and positioning can be improved with high precision without substantially changing the other portions of the configuration of the GPS receiver. In other words, it is possible to effectively utilize conventional resources (an actual apparatus and design data).

Note that a GPS system employing a GPS receiver has been described in the embodiment above as an example. The above-described configuration can be applied to all other radio navigation systems (GNSS) using PN codes as signals (e.g., the GALILEO system or the GLONASS system), and in this case, the above-described effect can be obtained. Further, the above-described configuration can be applied to a general radio communication system which receives a radio signal modulated with a PN code, and a radio communication apparatus employing the system, and in this case, the above-described effect can be provided.

The invention claimed is:

1. A code NCO for generating a code enable signal for code phase observation, comprising:
   a first multiplexer which is configured to receive two relatively prime integers, and to feed either of the two integers as a first integer output in accordance with a select signal;
   an adder which is configured to add the first integer output from the first multiplexer and an integer output from a register in order to feed a second integer output;
   a second multiplexer which is configured to receive the second integer output from the adder and a code phase adjustment value, and to feed either of them as a third integer output based on an adjustment signal;
   the register which is configured to latch and to feed the third integer output from the second multiplexer as a fourth integer output in accordance with a sampling clock signal; and
   a select signal generator which is configured to output the select signal when the select signal generator detects that the fourth integer output from the register is a predetermined integer value which is previously set,
   wherein the select signal is the code enable signal and, wherein the select signal generator is a comparator which is configured to compare the fourth integer output from the register with a threshold determined from the two integers in order to output the select signal.

2. A GPS receiver comprising:
   the code NCO according to claim 1,
   wherein the GPS receiver captures and tracks a code phase of a GPS signal by using a PN code generated based on a code enable signal output from the code NCO.

3. A code NCO for generating a code enable signal for code phase observation, comprising:
   a first multiplexer which is configured to receive two relatively prime integers, and to feed either of the two integers as a first integer output in accordance with a select signal;
   an adder which is to add the first integer from the first multiplexer and an integer output from a register in order to feed a second integer output;
   a second multiplexer which is configured to receive the second integer output from the adder and a code phase adjustment value, and to feed either of them as a third integer output based on an adjustment signal;
   the register which is configured to latch and to feed the third integer output from the second multiplexer as a fourth integer output in accordance with a sampling clock signal; and
   a select signal generator which is configured to output the select signal when the select signal generator detects that the fourth integer output from the register is a predetermined integer value which is previously set,
   wherein the select signal is the code enable signal and, wherein the select signal generator is an AND operator which is configured to output the select signal by using a result of subjecting values of a plurality of predetermined bits of the register to an AND process.

4. A GPS receiver comprising:
   the code NCO according to claim 3,
   wherein the GPS receiver captures and tracks a code phase of a GPS signal by using a PN code generated based on a code enable signal output from the code NCO.

5. A code NCO for generating a code enable signal for code phase observation, comprising:
   a first multiplexer which is configured to receive two relatively prime integers, and to feed either of the two integers as a first integer output in accordance with a select signal;
   an adder which is configured to add the first integer output from the first multiplexer and an integer output from a register in order to feed a second integer output;
   a second multiplexer which is configured to receive the second integer output from the adder and a code phase adjustment value, and to feed either of them as a third integer output based on an adjustment signal;
   the register which is configured to latch and to feed the third integer output from the second multiplexer as a fourth integer output in accordance with a sampling clock signal; and
   a select signal generator which is configured to output the select signal when the select signal generator detects that the fourth integer output from the register is a predetermined integer value which is previously set,
   wherein the select signal is the code enable signal and, wherein the select signal generator is a NOR operator which is configured to output the select signal by using a result of subjecting values of a plurality of predetermined bits of the register to a NOR process.

6. A GPS receiver comprising:
   the code NCO according to claim 5,
   wherein the GPS receiver captures and tracks a code phase of a GPS signal by using a PN code generated based on a code enable signal output from the code NCO.

* * * * *